(12) United States Patent
Yoshihara et al.

(10) Patent No.: US 11,892,358 B2
(45) Date of Patent: Feb. 6, 2024

(54) TEMPERATURE DETECTION DEVICE AND ASSEMBLY THEREOF

(71) Applicant: SHIBAURA ELECTRONICS CO., LTD., Saitama (JP)

(72) Inventors: Takamasa Yoshihara, Saitama (JP); Michiru Takemura, Semboku (JP); Masanori Kirihara, Semboku (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 899 days.

(21) Appl. No.: 16/956,963

(22) PCT Filed: Aug. 2, 2018

(86) PCT No.: PCT/JP2018/028956
§ 371 (c)(1),
(2) Date: Jun. 22, 2020

(87) PCT Pub. No.: WO2020/026394
PCT Pub. Date: Feb. 6, 2020

(65) Prior Publication Data
US 2020/0393306 A1    Dec. 17, 2020

(51) Int. Cl.
*G01K 1/14* (2021.01)
*H02K 11/25* (2016.01)
*G01K 7/22* (2006.01)

(52) U.S. Cl.
CPC ............ *G01K 1/14* (2013.01); *G01K 7/22* (2013.01); *H02K 11/25* (2016.01)

(58) Field of Classification Search
CPC ............ G01K 1/14; G01K 1/143; G01K 1/16; G01K 7/22; G01K 17/00
(Continued)

(56) References Cited

U.S. PATENT DOCUMENTS 4,164,433 A * 8/1979 Granahan ................ G01K 7/02
  374/E1.019
5,172,979 A * 12/1992 Barkley ................. H10N 10/17
  374/E1.019
(Continued)

FOREIGN PATENT DOCUMENTS

CN      202757702 U    2/2013
CN      107209062 A    9/2017
(Continued)

OTHER PUBLICATIONS

16956963_2023-09-29_EP_3252447_A1_H.pdf, Dec. 2017.*
(Continued)

*Primary Examiner* — Gail Kaplan Verbitsky
(74) *Attorney, Agent, or Firm* — Pearne & Gordon, LLP

(57) ABSTRACT

A temperature detection device that can facilitate attachment of a temperature sensor to a coil and can improve thermal responsiveness by a simple structure reduced in the number of components. Such a temperature detection device includes a temperature sensor including a thermosensitive body configured to detect temperature of a coil of a rotary electric machine to be mounted on a vehicle, and a metal bracket attaching the temperature sensor to the coil. The bracket includes a bracket main body clamping the coil by elastic force, and a joining portion joined to the temperature sensor. The bracket main body includes a clamping portion internally clamping the coil, and a heat collection portion that protrudes to outside of the clamping portion and is thermally coupled to the temperature sensor.

20 Claims, 17 Drawing Sheets

(58) Field of Classification Search
USPC .................................. 374/141, 163, 208
See application file for complete search history.

(56) References Cited

U.S. PATENT DOCUMENTS

| | | | | |
|---|---|---|---|---|
| 5,454,641 | A * | 10/1995 | Parker | G01K 1/20 |
| | | | | 374/E1.019 |
| 6,153,954 | A * | 11/2000 | Uchida | H02K 11/25 |
| | | | | 310/71 |
| 6,158,886 | A * | 12/2000 | Dutcher | G01K 1/143 |
| | | | | 374/E1.019 |
| 6,550,962 | B1 * | 4/2003 | Yang | G01K 1/143 |
| | | | | 374/E1.019 |
| 6,779,919 | B1 * | 8/2004 | Staniforth | G01K 1/143 |
| | | | | 374/E1.019 |
| 9,261,412 | B2 * | 2/2016 | Yoshida | G01K 13/02 |
| 9,677,947 | B2 * | 6/2017 | Hoenicka | G01K 1/08 |
| 10,704,979 | B2 * | 7/2020 | Bailey | G01K 13/02 |
| 10,742,093 | B2 | 8/2020 | Yoshihara et al. | |
| 10,935,434 | B2 | 3/2021 | Yoshihara et al. | |
| 11,054,316 | B2 | 7/2021 | Yoshihara | |
| 2002/0191673 | A1 * | 12/2002 | Lee | G01K 1/14 |
| | | | | 374/208 |
| 2004/0028118 | A1 * | 2/2004 | Sidoni | G01K 1/143 |
| | | | | 374/E1.019 |
| 2007/0296541 | A1 * | 12/2007 | Garcia | H01C 1/148 |
| | | | | 361/704 |
| 2008/0008227 | A1 * | 1/2008 | Jang | F24F 1/26 |
| | | | | 374/208 |
| 2010/0067562 | A1 * | 3/2010 | Wakabayashi | G01K 1/14 |
| | | | | 374/208 |
| 2012/0031517 | A1 * | 2/2012 | Yoshida | G01K 13/02 |
| | | | | 374/185 |
| 2012/0250727 | A1 * | 10/2012 | Schlipf | G01K 1/14 |
| | | | | 374/E7.004 |
| 2014/0184031 | A1 * | 7/2014 | Kaneshige | H02K 11/25 |
| | | | | 310/68 B |
| 2017/0370781 | A1 | 12/2017 | Yoshihara et al. | |
| 2018/0017446 | A1 * | 1/2018 | Yoshihara | H02K 11/25 |

FOREIGN PATENT DOCUMENTS

| | | | | |
|---|---|---|---|---|
| CN | 206804173 | U | 12/2017 | |
| EP | 3252447 | A1 * | 12/2017 | ............... G01K 1/14 |
| EP | 3264056 | A1 * | 1/2018 | ............... G01K 1/08 |
| EP | 3401658 | A1 * | 11/2018 | ............... G01K 1/14 |
| JP | H08-219904 | A | 8/1996 | |
| JP | H09-324969 | A | 12/1997 | |
| JP | 2001074563 | A * | 3/2001 | |
| JP | 2011223827 | A | 11/2011 | |
| JP | 2013172478 | A * | 9/2013 | |
| JP | 2016-161434 | A | 9/2016 | |
| JP | 6005893 | B1 | 10/2016 | |
| JP | 2017026521 | A | 2/2017 | |
| JP | 2017026621 | A * | 2/2017 | |
| JP | 2017227568 | A | 12/2017 | |
| JP | 6282791 | B1 | 2/2018 | |
| JP | 6297765 | B1 * | 3/2018 | ............... G01K 1/14 |
| JP | 6297765 | B1 | 3/2018 | |
| JP | 6535428 | B1 * | 6/2019 | ............... G01K 1/14 |
| JP | 6894767 | B2 * | 6/2021 | |
| WO | WO-2013030644 | A2 * | 3/2013 | ......... H02K 11/0047 |
| WO | 2017090363 | A1 | 6/2017 | |
| WO | 2017221464 | A1 | 12/2017 | |
| WO | WO-2020026394 | A1 * | 2/2020 | ............... G01K 1/08 |

OTHER PUBLICATIONS

16956963_2023-09-29_JP_6894767_B2_H.pdf, Jun. 2021.*
16956963_2023-09-29_WO_2013030644_A2_H.pdf, Mar. 2013.*
6956963_2023-09-29_JP_2013172478_A_H.pdf, Sep. 2013.*
16956963_2023-09-29_JP_2001074563_A_H.pdf, Mar. 2001.*
International Search Report for PCT/JP2018/028956 dated Nov. 6, 2018.
Office action for Japanese Patent Application No. 2019-511676 dated May 29, 2019.
Extended European search report for EP18928221 dated Jun. 9, 2021.
Office action for Chinese Patent Application No. 201880071199.3 dated Nov. 9, 2020.
CN2018800711993 Office action dated Feb. 7, 2021 and translation thereof.

* cited by examiner

TEMPERATURE DETECTION DEVICE AND ASSEMBLY THEREOF

This is the National Stage of PCT international application PCT/JP2018/028956 filed on Aug. 2, 2018, the content of which is incorporated herein by reference in its entirety.

TECHNICAL FIELD

The present invention relates to a temperature detection device used to detect temperature of a coil.

BACKGROUND ART

A temperature sensor is used to detect temperature of a coil included in a stator of a rotary electric machine to be mounted on a vehicle or the like (Patent Literature 1). The temperature sensor disclosed in Patent Literature 1 is provided with a resin holder. The holder includes a sensor holder holding the temperature sensor, and an electric wire holder holding a lead wire of the temperature sensor.

One side of a C-shaped metal clip is fixed to the sensor holder disclosed in Patent Literature 1. The temperature sensor can be easily attached to the rectangular coil by clipping the rectangular coil between the sensor holder and a resin pad attached to the other side of the clip.

CITATION LIST

Patent Literature

Patent Literature 1: JP 6005893 B2

SUMMARY OF INVENTION

Technical Problem

According to Patent Literature 1, since the plurality of resin components (sensor holder, electric wire holder, and pad) are used in addition to the clip in order to attach the temperature sensor to the coil, the number of components is large.

Further, the resin components are disposed around the coil and the temperature sensor, and heat is conducted from the coil to the temperature sensor through the resin components. Therefore, there is a room for improvement in responsiveness of temperature detection.

An object of the present invention is to provide a temperature detection device that can facilitate attachment of a temperature sensor to a coil and can improve thermal responsiveness by a simple structure reduced in the number of components.

Solution to Problem

A first temperature detection device according to the present invention includes a temperature sensor including a thermosensitive body configured to detect temperature of a coil of a rotary electric machine to be mounted on a vehicle, and a metal bracket attaching the temperature sensor to the coil. The bracket includes a bracket main body clamping the coil by elastic force, and a joining portion joined to the temperature sensor. The bracket main body includes a clamping portion internally clamping the coil, and a heat collection portion that protrudes to outside of the clamping portion and is thermally coupled to the temperature sensor.

In the first temperature detection device according to the present invention, the temperature sensor preferably comes into contact with the coil through a part of the clamping portion.

In the first temperature detection device according to the present invention, the temperature sensor is preferably disposed between a wall that is the part of the clamping portion and a facing portion of the heat collection portion facing the wall.

In the first temperature detection device according to the present invention, the wall and the facing portion preferably extend over a thermosensitive region that includes at least the thermosensitive body of the temperature sensor.

In the first temperature detection device according to the present invention, the heat collection portion preferably conducts heat of the coil to a thermosensitive region that includes at least the thermosensitive body of the temperature sensor.

A second temperature detection device according to the present invention includes a temperature sensor including a thermosensitive body configured to detect temperature of a coil of a rotary electric machine to be mounted on a vehicle, and a metal bracket attaching the temperature sensor to the coil. The bracket includes a bracket main body clamping the coil and the temperature sensor by elastic force, and a joining portion joined to the temperature sensor.

In the second temperature detection device according to the present invention, the bracket main body is preferably provided with a supporting portion supporting the temperature sensor.

In the first and second temperature detection devices according to the present invention, the bracket main body preferably includes a fastened portion fastened to the coil.

A third temperature detection device according to the present invention includes a temperature sensor including a thermosensitive body configured to detect temperature of a coil of a rotary electric machine to be mounted on a vehicle, and a metal bracket attaching the temperature sensor to the coil. The bracket includes a bracket main body that is disposed over a thermosensitive region including at least the thermosensitive body of the temperature sensor and is thermally coupled to the temperature sensor, a joining portion joined to the temperature sensor, and a fastened portion fastened to the coil.

The following configurations are common to the first to third temperature detection devices.

In the temperature detection device according to the present invention, the joining portion is preferably joined to a joined portion of the temperature sensor that is located at a position different from the thermosensitive body.

In the temperature detection device according to the present invention, the joined portion is preferably located at a position of the temperature sensor different from both of the thermosensitive body and an electric wire provided on the thermosensitive body.

In the temperature detection device according to the present invention, the temperature sensor preferably includes a thermosensitive element that includes the thermosensitive body and an electric wire provided on the thermosensitive body, and an insulating protective member provided at least on the thermosensitive body and a part of the electric wire of the thermosensitive element, and the joined portion is preferably located on the protective member.

In the temperature detection device according to the present invention, the joined portion is preferably made of a resin material in a solid state.

In the temperature detection device according to the present invention, the bracket main body is preferably disposed over a thermosensitive region including at least the thermosensitive body of the temperature sensor.

In the temperature detection device according to the present invention, the thermosensitive region preferably further includes a part of an electric wire provided on the thermosensitive body.

In the temperature detection device according to the present invention, the electric wire provided on the thermosensitive body preferably includes a first electric wire connected to the thermosensitive body, and a second electric wire connected to the first electric wire, and the thermosensitive region preferably further includes a whole of the first electric wire.

In the temperature detection device according to the present invention, the temperature sensor preferably extends in a longitudinal direction in which an electric wire provided on the thermosensitive body extends, and is preferably surrounded around an axis line set along the longitudinal direction by the bracket main body.

In the temperature detection device according to the present invention, the bracket is preferably a single member integrally made of a metal plate.

In the temperature detection device according to the present invention, the joining portion preferably includes paired protrusion pieces caulked to the temperature sensor.

In the temperature detection device according to the present invention, the bracket main body is preferably provided with a stopper that prevents separation of the coil.

A first assembly according to the present invention includes a temperature detection device assembled to a coil of a rotary electric machine to be mounted on a vehicle, and a coil element configuring a part of the coil. The temperature detection device includes a temperature sensor including a thermosensitive body configured to detect temperature of the coil, and a metal bracket attaching the temperature sensor to the coil element. The bracket includes a bracket main body clamping the coil by elastic force, and a joining portion joined to the temperature sensor. The bracket main body includes a clamping portion internally clamping the coil, and a heat collection portion that protrudes to outside of the clamping portion and is thermally coupled to the temperature sensor.

A second assembly according to the present invention includes a temperature detection device assembled to a coil of a rotary electric machine to be mounted on a vehicle, and a coil element configuring a part of the coil. The temperature detection device includes a temperature sensor including a thermosensitive body configured to detect temperature of the coil, and a metal bracket attaching the temperature sensor to the coil element. The bracket includes a bracket main body clamping the coil and the temperature sensor by elastic force, and a joining portion joined to the temperature sensor.

A third assembly according to the present invention includes a temperature detection device assembled to a coil of a rotary electric machine to be mounted on a vehicle, and a coil element configuring a part of the coil. The temperature detection device includes a temperature sensor including a thermosensitive body configured to detect temperature of the coil, and a metal bracket attaching the temperature sensor to the coil element. The bracket includes a bracket main body that is disposed over a thermosensitive region including at least the thermosensitive body of the temperature sensor and is thermally coupled to the temperature sensor, a joining portion joined to the temperature sensor, and a fastened portion fastened to the coil.

Advantageous Effects of Invention

The bracket of the temperature detection device according to the present invention that has both of the function of clamping the coil or being fastened to the coil and the function of holding the temperature sensor by joining can be configured in a simple form as one member in which the bracket main body and the joining portion are continues to each other. Using the bracket having the simple configuration makes it possible to hold the temperature sensor by the joining portion, and to clamp the coil in the inside of the bracket main body, thereby easily attaching the temperature sensor to the coil.

In addition, the metal bracket also has the function of collecting the heat of the coil to the temperature sensor because of high thermal conductivity. The thermal responsiveness of temperature detection by the temperature sensor can be improved based on the heat collection action.

DESCRIPTION OF EMBODIMENTS

Some embodiments of the present invention are described below with reference to accompanying drawings.

A temperature detection device according to each of the embodiments described below is attached to a coil provided in a rotary electric machine such as a motor to be mounted on a vehicle such as an automobile, in order to measure temperature of the coil.

First Embodiment

A temperature detection device 1 according to a first embodiment is described with reference to FIG. 1 to FIGS. 4A, 4B.

Figure 1:
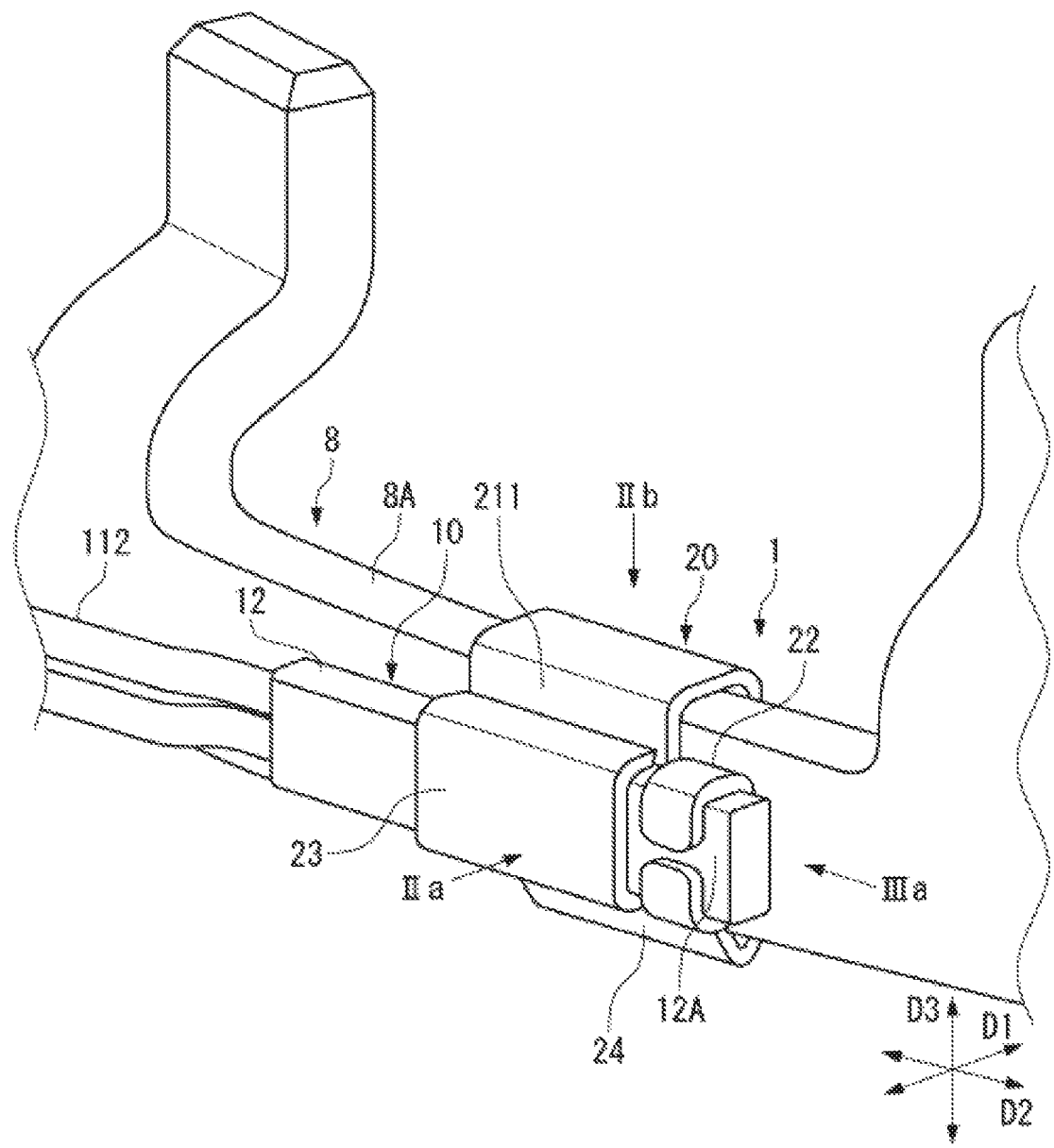
FIG. 1 is a perspective view illustrating a temperature detection device and a coil attached with the temperature detection device according to a first embodiment.

FIG. 1 illustrates the temperature detection device 1 attached to a coil 8 of an unillustrated stator to which an alternating current is applied.

A part of the coil 8 is illustrated in FIG. 1. The illustrated part corresponds to a bus bar connected to an unillustrated neutral point of u, v, and w phases. The temperature detection device 1 is attached to a portion (hereinafter, referred to as extending portion 8A) of the bus bar extending in one direction.

A temperature sensor 10 held by a bracket 20 is attached to the extending portion 8A of the coil 8.

Figure 2A:
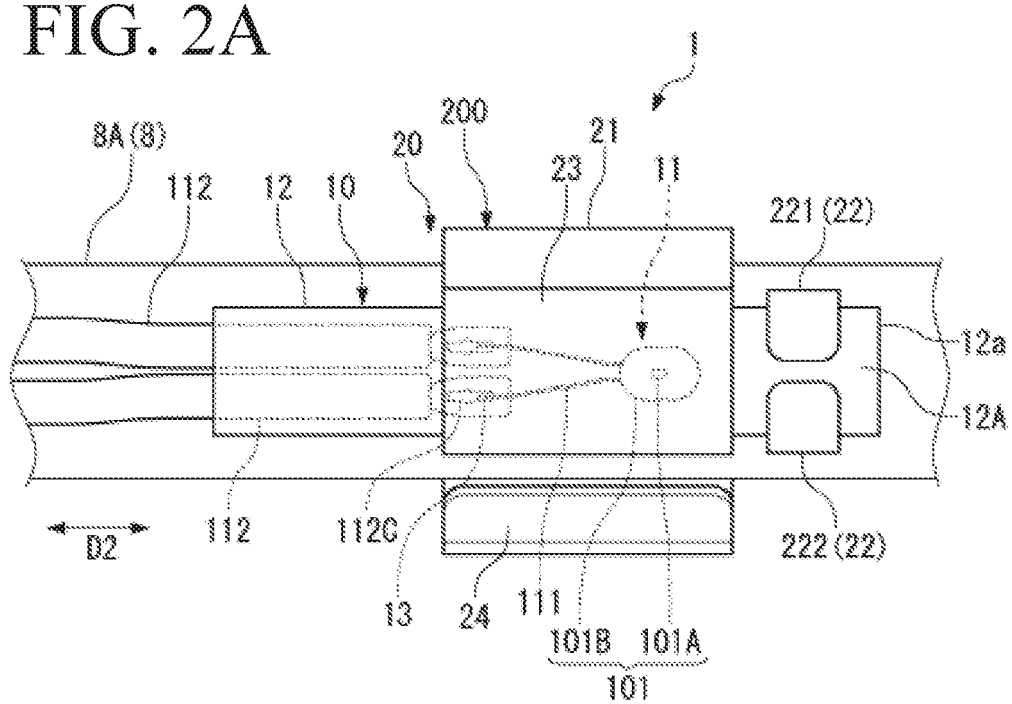
FIG. 2A is a side view illustrating the temperature detection device and the coil from a direction of an arrow IIa in FIG. 1, in which a thermosensitive body and electric wires of a temperature sensor are illustrated by dashed lines.
Figure 2B:
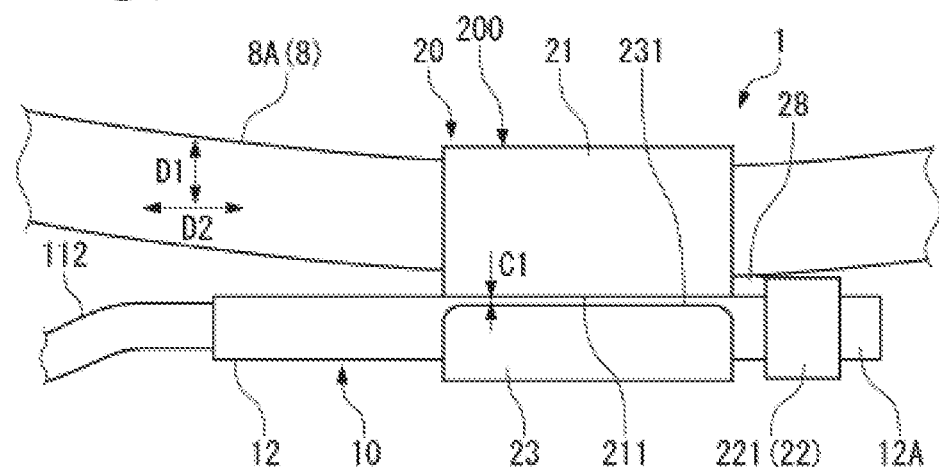
FIG. 2B is a plan view illustrating the temperature detection device and the coil from a direction of an arrow IIb in FIG. 1.
Figure 3A:
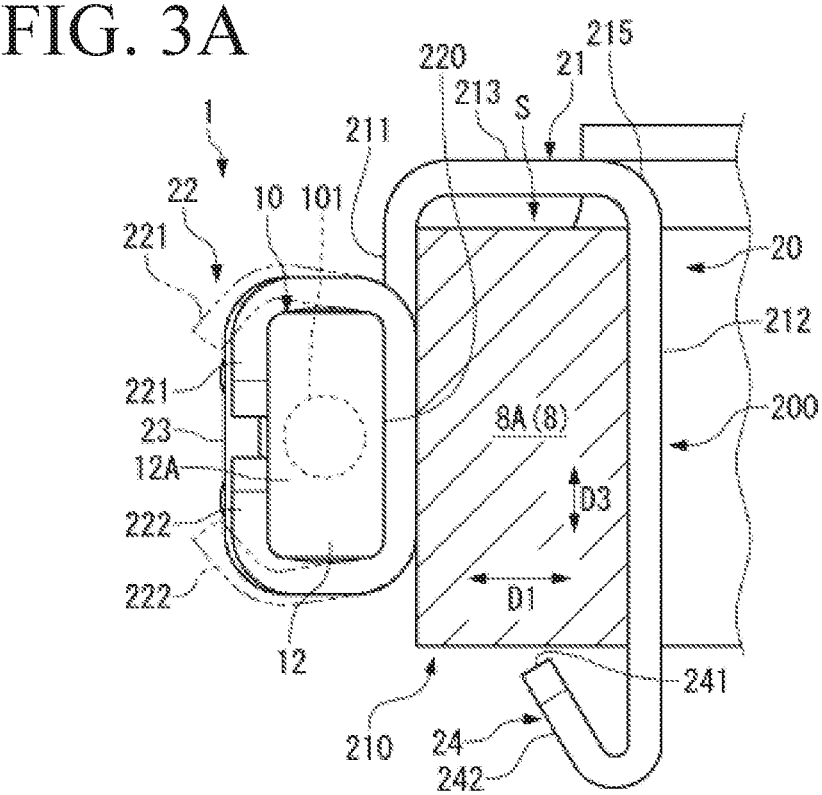
FIG. 3A is a diagram illustrating the temperature detection device and the coil from a direction of an arrow IIIa in FIG. 1, in which the coil is broken away.

The extending portion 8A extends in a gentle arc shape in a plan view (FIG. 2B), and linearly extends in a side view (FIG. 2A). As illustrated in FIG. 3A, the extending portion 8A of the coil 8 is formed in a rectangular shape, and has a substantially rectangular cross-section.

The extending portion 8A may linearly extend in a plan view and a side view (see FIGS. 13A, 13B to FIGS. 16A, 16B).

A surface of the coil 8 made of a metal material is typically coated with an unillustrated insulating coating. The coating may be removed over a range of the extending portion 8A where the temperature detection device 1 is attached.

The temperature sensor 10 has an elongated rectangular-parallelepiped appearance shape. As illustrated in FIG. 2A, the temperature sensor 10 attached to the coil 8 by the bracket 20 is disposed along the extending portion 8A. In the present embodiment, a case where the temperature sensor 10 is formed in a rectangular-parallelepiped shape is illustrated; however, the temperature sensor 10 may be curved in an arc shape so as to extend along the extending portion 8A also in a plan view.

In the present specification, a direction in which the extending portion 8A of the coil 8 is clamped by the bracket 20 is referred to as a clamping direction D1. The clamping direction D1 corresponds to a thickness direction of the extending portion 8A.

Further, a longitudinal direction of the temperature sensor 10 is referred to as a front-rear direction D2, and a direction orthogonal to the front-rear direction D2 and the clamping direction D1 is referred to as a height direction D3. A side of the temperature sensor 10 on which a thermosensitive body 101 (FIG. 2A) is located is defined as "front", and a side opposite thereto is defined as "rear".

In a state where the temperature sensor 10 is attached to the extending portion 8A by the bracket 20, the clamping direction D1 and the front-rear direction D2 are orthogonal to each other.

A configuration of the temperature detection device 1 is described in detail below.

The temperature detection device 1 includes the temperature sensor 10 that detects temperature of the coil 8, and the metal bracket 20 that attaches the temperature sensor 10 to the coil 8.

[Temperature Sensor]

A configuration of the temperature sensor 10 is described in detail with reference to FIG. 2A and FIG. 4A.

The temperature sensor 10 includes a thermosensitive element 11 that detects temperature, and an insulating protective member 12 provided in the thermosensitive element 11, and comes into contact with the coil 8 through the bracket 20 while being held by the bracket 20.

(Thermosensitive Element)

The thermosensitive element 11 includes the thermosensitive body 101 and paired electric wires 110. The thermosensitive body 101 includes a thermosensitive portion 101A that can detect temperature based on change of electric resistance to the temperature change. The paired electric wires 110 are electrically connected to an unillustrated electrode provided at the thermosensitive portion 101A, and are drawn out rearward from the thermosensitive body 101.

The temperature sensor 10 has an elongated shape along a direction (longitudinal direction) in which the electric wires are drawn out from the thermosensitive body 101.

The thermosensitive body 101 includes the thermosensitive portion 101A and a coating glass 101B sealing the thermosensitive portion 101A. As the thermosensitive portion 101A, a resistor such as a thermistor having a predetermined temperature coefficient can be widely used.

The paired electric wires 110 are drawn out in the same direction (rearward) from the coating glass 101B of the thermosensitive body 101.

Each of the electric wires 110 includes a Dumet wire 111 that is a first electric wire drawn out from the coating glass 101B, and a lead wire 112 that is a second electric wire connected to the Dumet wire 111.

Each of the Dumet wires 111 is obtained by joining a rolled copper alloy coating with a core wire made of an iron-nickel alloy having a linear expansion coefficient close to a linear expansion coefficient of the coating glass 101B. As each of the first electric wires, in place of the Dumet wire 111, a wire material made of platinum or a platinum alloy may be used, or a platinum clad wire obtained by joining a rolled platinum coating may be used in place of a core wire made of an iron-nickel alloy.

Each of the lead wires 112 includes a core wire 112A made of twisted wires or the like, and an insulating coating 112B coating the core wire 112A. The core wires 112A are electrically connected to the respective Dumet wires 111. In the present embodiment, ends of the Dumet wires 111 are joined to respective pads 112C connected to the core wires 112A by welding or the like. As a result, the Dumet wires 111 and the respective core wires 112A are electrically connected. Each of the lead wires 112 is connected to an unillustrated circuit substrate through the other electric wire as necessary.

(Protective Member)

The protective member 12 covers the thermosensitive element 11 over the thermosensitive body 101, the Dumet wires 111 drawn out from the thermosensitive body 101, and a part of the lead wires 112 connected to the respective Dumet wires 111.

The protective member 12 protects the thermosensitive body 101, the Dumet wires 111, and the core wires 112A from external force such as impact, and contributes to insulation between the thermosensitive element 11 and the coil 8.

The protective member 12 is made of a fluorine resin such as polytetrafluoroethylene (PTFE) and tetrafluoroethylene-perfluoroalkylvinylether copolymer (PFA). The protective member 12 may be made of an appropriate resin material irrespective of a thermoplastic resin and a thermosetting resin, in addition to these resin materials.

When the protective member 12 is made of a transparent resin, appearance inspection of the thermosensitive element 11 is performable through the protective member 12.

Figure 3B:
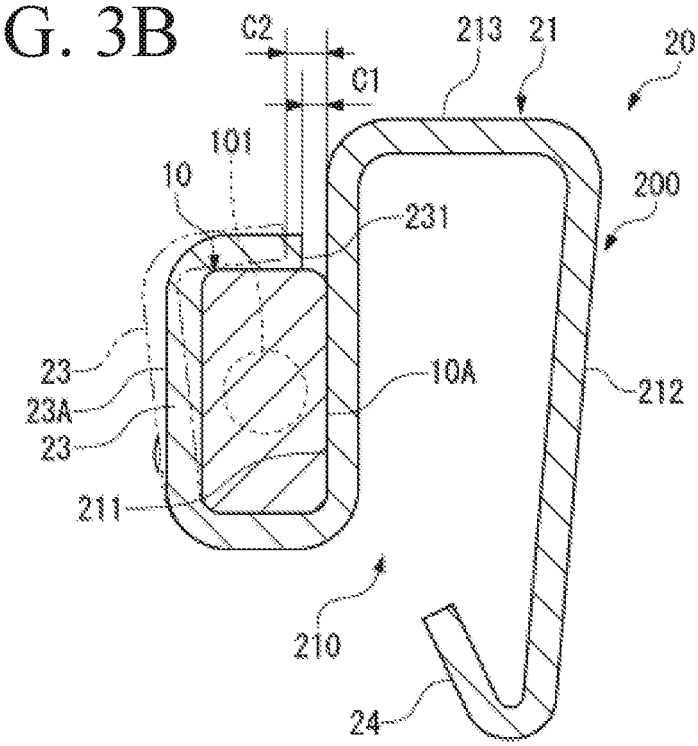
FIG. 3B is a cross-sectional view of the temperature detection device taken along a line IIIb-IIIb in FIG. 4A.

The protective member 12 according to the present embodiment has a substantially rectangular-parallelepiped outer shape extending in the front-rear direction. As illustrated in FIG. 3B, the protective member 12 has a flat contact surface (10A, see FIG. 3B) that comes into contact with the coil 8 through a part of the bracket 20, and a joined portion 12A.

The protective member 12 can be manufactured by, for example, injection molding while the thermosensitive element 11 is placed in a mold.

Note that the protective member 12 may not have a constant thickness. For example, a front end 12a side of the protective member 12 on which a joining portion 22 is disposed may be smaller in thickness than a part where the joining portion 22 is not disposed.

(Joined Portion)

Figure 4A:
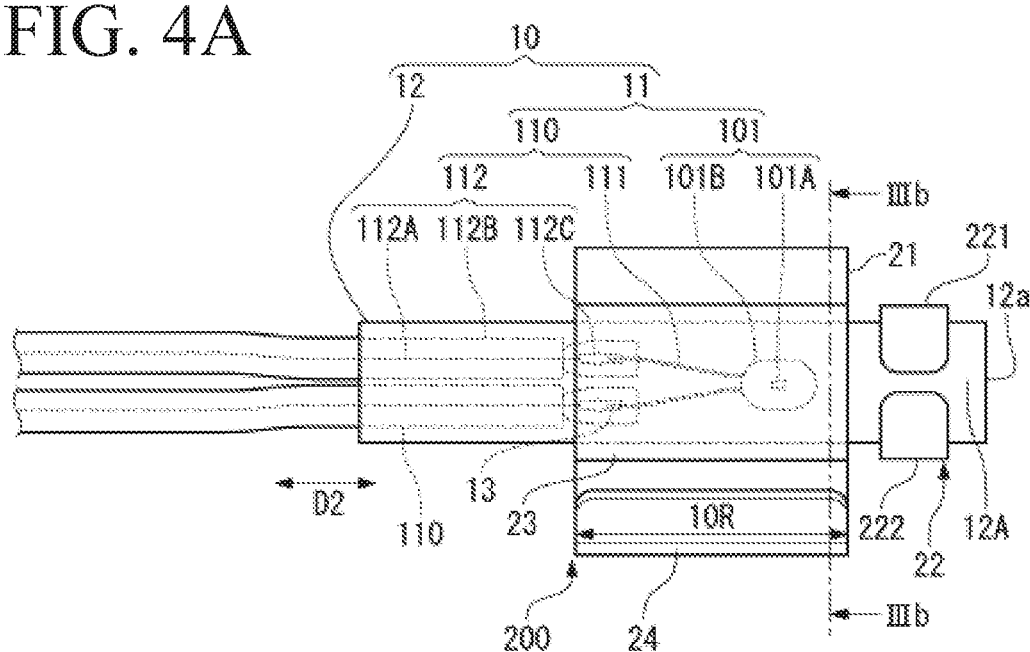
FIG. 4A is a side view illustrating the temperature detection device.

As illustrated in FIG. 4A, the protective member 12 is set to a predetermined length extending rearward from the front end 12a. Neither the thermosensitive body 101 nor the electric wires 110 of the thermosensitive element 11 are present in the joined portion 12A. The joined portion 12A is made of a resin material in a solid state.

The joining portion 22 (described below) of the bracket 20 is joined to the joined portion 12A. Therefore, the joined portion 12A is set at a position different from the thermosensitive body 101 and the electric wires 110 so as not to destroy the thermosensitive element 11 when the joining portion 22 is caulked. The joined portion 12A according to the present embodiment corresponds to a portion protruding forward from a bracket main body 200 in the temperature sensor 10.

Note that the joined portion 12A is set to a length (dimension in longitudinal direction of temperature sensor 10) sufficient to be stably joined to the joining portion 22 of the bracket 20.

The form of the temperature sensor 10 is not limited to the form described in the present embodiment, and the temperature sensor 10 may have an appropriate form. For example, the appearance shape of the protective member 12 is not limited to the rectangular-parallelepiped shape, and may be a cylindrical shape or the like. The thermosensitive element 11 may be covered with a protective member such as a tube made of an insulating material, in place of the protective member 12. At this time, one part and the other part of the thermosensitive element 11 may be independently covered with different protective members.

Also in this case, the joined portion may be provided at a position other than the positions of the thermosensitive body 101 and the electric wires 110, in the temperature sensor 10.

[Bracket]

Next, a configuration of the metal bracket 20 is described with reference to FIG. 1 to FIGS. 3A, 3B.

The bracket 20 is a single member made of a metal material. The bracket 20 holds the temperature sensor 10, and clamps the coil 8. The bracket 20 includes the bracket main body 200 that clamps the coil 8 by elastic force and collects heat to the temperature sensor 10, and the joining portion 22 to be joined to the temperature sensor 10.

Typically, the metal material used for the bracket 20 is remarkably higher in thermal conductivity than the other material such as a resin. Therefore, the temperature change of the bracket 20 rapidly follows the temperature change of the coil 8. Heat is transferred to the temperature sensor 10 not only from the one surface 10A (FIG. 3B) side facing the coil 8 but also from the other surfaces (surfaces other than one surface 10A) of the temperature sensor 10 abutting on the bracket 20, through the bracket 20. In other words, when the heat of the coil 8 is collected to the temperature sensor 10 by the bracket 20, the temperature sensor 10 detects the temperature of the coil 8 without delay from the temperature change of the coil 8, which makes it possible to improve responsiveness of temperature detection.

The bracket 20 may be made of an appropriate metal material that can clamp the coil 8 by elastic force, for example, an iron alloy, stainless steel, or phosphor bronze. A so-called spring material, for example, spring steel defined in JIS G 4801 can be used for the bracket 20.

(Bracket Main Body)

The bracket main body 200 includes a clamping portion 21, a heat collection portion 23, and a stopper 24.

In the first embodiment, the temperature sensor 10 is disposed between the heat collection portion 23 and a part of the clamping portion 21.

(Clamping Portion)

The clamping portion 21 is described with reference to FIGS. 3A and 3B. A portion of the bracket main body 200 that is bent in a substantially U-shape so as to clamp the extending portion 8A of the coil 8 corresponds to the clamping portion 21. A space inside the clamping portion 21 houses the coil 8 through an opening 210.

The clamping portion 21 includes a first wall 211, a second wall 212, and a coupling portion 213 that couples the first wall 211 and the second wall 212. The first wall 211 and the second wall 212 are provided to face each other, and clamp the extending portion 8A in a thickness direction (clamping direction D1). The coupling portion 213 couples the first wall 211 and the second wall 212 on a side opposite to the opening 210.

A dimension of the coupling portion 213 in the clamping direction D1 corresponds to the thickness of the extending portion 8A.

Note that the clamping portion 21 may be configured to clamp the extending portion 8A in the height direction D3. The configuration corresponds to a state where the clamping portion 21 is rotated by 90 degrees relative to the extending portion 8A on a paper surface of FIG. 3A.

As illustrated in FIG. 3B, when the clamping portion 21 is in a non-load stage, the second wall 212 is inclined to the first wall 211. A distance between the first wall 211 and the second wall 212 at this time is set shorter on the opening 210 side than on the coupling portion 213 side.

When the extending portion 8A is inserted between the first wall 212 and the second wall 212 of the clamping portion 21 from the opening 210, the clamping portion 21 on the opening 210 side is forcibly expanded outward and is elastically deformed as illustrated in FIG. 3A. The extending portion 8A is clamped between the first wall 211 and the second wall 212 by the elastic force of the clamping portion 21 elastically deformed.

At this time, the first wall 211 contacts with a side surface of the extending portion 8A on an outer periphery side, the second wall 212 contacts with a side surface of the extending portion 8A on an inner periphery side, and the extending portion 8A is clamped between the first wall 211 and the second wall 212 that are substantially in parallel with each other, over the height direction D3.

A dimension in the height direction D3 between the coupling portion 213 and an end part 241 of the stopper 24 is preferably set so as to remain a gap S between the coupling portion 213 and the extending portion 8A when the extending portion 8A is completely inserted into the inside of the clamping portion 21. This makes it possible to surely insert the entire extending portion 8A into the inside of the clamping portion 21.

(Stopper)

The bracket 20 is preferably provided with the stopper 24 in order to prevent separation of the coil 8 from the clamping portion 21.

The stopper 24 communicates with the second wall 212, and is formed by bending one end of the second wall 212 in a V-shape toward the first wall 211 at a position beyond the coil 8 on the opening 210 side. The end part 241 of the stopper 24 is located near the opening 210 and faces the coil 8, which regulates separation of the coil 8 from the clamping portion 21.

Figure 5A:
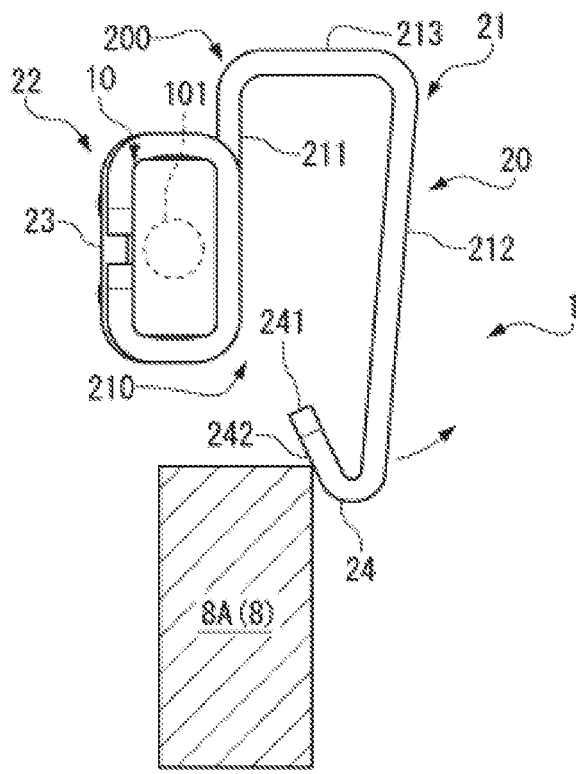
FIG. 5A is a diagram illustrating guide action by a stopper of a bracket.

As illustrated in FIG. 5A, when the coil 8 abuts on an outer inclined surface 242 of the V-shaped stopper 24, the opening 210 is expanded due to displacement and deformation of the second wall 212 (see arrow). The extending portion 8A of the coil 8 can be easily inserted into the inside of the clamping portion 21 through the expanded opening 210.

In other words, the stopper 24 according to the present embodiment also functions as a guide that guides the coil 8 to be smoothly inserted into the inside of the clamping portion 21.

Figure 5B:
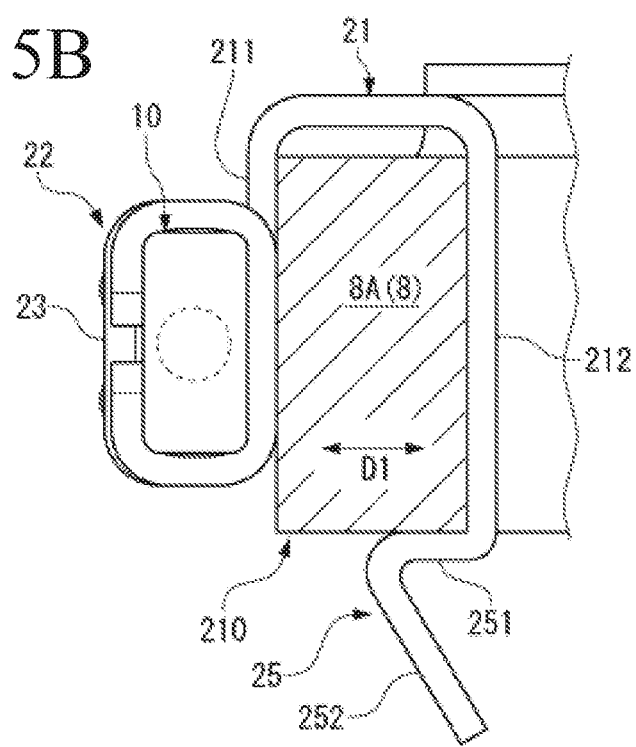
FIG. 5B is a diagram illustrating a modification of the stopper.

Note that the stopper 24 is not limited to the stopper 24 formed at one end of the second wall 212 as described above. For example, in place of the stopper 24, the bracket 20 may include a stopper 25 illustrated in FIG. 5B. The stopper 25 includes a coil supporting portion 251 and a guide portion 252. The coil supporting portion 251 protrudes from the second wall 212 toward the first wall 211 in the clamping direction D1 and supports the coil 8. The guide portion 252 is inclined outward from a front end of the coil supporting portion 251 in the clamping direction D1.

The stopper 25 guides the coil 8 toward the inside of the clamping portion 21 by the guide portion 252, and prevents separation of the coil 8 from the clamping portion 21 by the coil supporting portion 251.

The bracket 20 may include a stopper having the other configuration that prevents separation of the coil 8 and preferably contributes to smooth insertion of the coil 8. The stopper may be provided on the first wall 211, or provided on both of the first wall 211 and the second wall 212, depending on the form of the bracket 20.

Each of the stoppers 24 and 25 is not limited to the shape formed by bending one end of the first wall 211 or the second wall 212. For example, an elastic piece of another member may be attached to the end part of the first wall 212 or the second wall 212 as long as the elastic piece can prevent separation of the bracket from the coil.

(Heat Collection Portion)

The heat collection portion 23 (FIG. 1 and FIG. 3B) protrudes to outside of the clamping portion 21 that internally clamps the coil 8, and is thermally coupled to the temperature sensor 10. Since the heat collection portion 23 is thermally coupled to the temperature sensor 10, it is possible to conduct heat from the heat collection portion 23 to the temperature sensor 10, and to collect the heat to the temperature sensor 10. The heat collection portion 23 communicates with the first wall 211 of the clamping portion 21, and supports the temperature sensor 10 on the outside of the clamping portion 21.

As illustrated in FIG. 3B, the heat collection portion 23 is bent along the surface of the temperature sensor 10 from an end part on the opening 210 side of the first wall 211 of the clamping portion 21.

The coil 8 is clamped between the first wall 211 and the second wall 212 of the clamping portion 21. Further, the temperature sensor 10 is clamped between the first wall 211 and the heat collection portion 23. More specifically, the temperature sensor 10 is disposed between the first wall 211 and a facing portion 23A (FIG. 3B) of the heat collection portion 23 facing the first wall 211.

The temperature sensor 10 supported by the heat collection portion 23 comes into contact with the coil 8 through the first wall 211. The one side surface 10A of the temperature sensor 10 is disposed on the first wall 211.

The heat of the coil 8 is transferred to the temperature sensor 10 not only from the one surface 10A side facing the coil 8 but also from the heat collection portion 23 side because of high thermal conductivity of the metal bracket 20.

The clamping portion 21 and the heat collection portion 23 according to the present embodiment are formed by bending a belt-like plate material having a constant width. Accordingly, the first wall 211 and the heat collection portion 23 are both disposed over the same region 10R (FIG. 4A) of the temperature sensor 10, and the temperature sensor 10 is clamped between the first wall 211 and the heat collection portion 23.

The region 10R (hereinafter, thermosensitive region) of the temperature sensor 10 clamped between the first wall 211 and the heat collection portion 23 is adjacent to a rear side of the above-described joined portion 12A.

The heat from the coil 8 is collected to the thermosensitive region 10R through the bracket 20. The heat collected to the thermosensitive region 10R is detected by the thermosensitive body 101.

It is sufficient for the thermosensitive region 10R to include at least only the thermosensitive body 101.

In the inside of the temperature sensor 10, the heat is conducted to the thermosensitive body 101 mainly through the Dumet wires 111. In other words, the Dumet wires 111 highly contribute to heat input to the thermosensitive body 101.

Accordingly, the thermosensitive region 10R according to the present embodiment extends from a position located anterior to the thermosensitive body 101 up to joint positions 13 between the Dumet wires 111 and the respective core wires 112A of the lead wires 112 in the front-rear direction D2, in consideration of heat conduction by the Dumet wires 111. The thermosensitive region 10R includes the whole of the thermosensitive body 101 and the Dumet wires 111 extending from the thermosensitive body 101.

Further, to prevent overheat of the coil 8, the rotor, the stator, and the like, a cooling liquid for cooling is supplied to an inside of the motor. In the present embodiment, since the temperature sensor 10 is covered with the heat collection portion 23, it is possible to prevent splash of the cooling liquid from directly adhering to the temperature sensor 10 while collecting the heat of the coil 8 to the temperature sensor 10 through the heat collection portion 23.

As illustrated in FIG. 3B, the heat collection portion 23 according to the present embodiment is disposed along three side surfaces other than the one surface 10A of the temperature sensor 10. Therefore, the temperature sensor 10 is surrounded around an axis line set along the longitudinal direction (D2) by the heat collection portion 23 and the first wall 211 of the bracket main body 200.

As a result, the heat can be efficiently collected over the entire circumference of the temperature sensor 10 by the heat collection portion 23 and the first wall 211. This makes it possible to improve thermal responsiveness of the temperature sensor 10 to the temperature change of the coil 8.

After the temperature sensor 10 is inserted into the inside of the heat collection portion 23 from a direction orthogonal to a paper surface of FIG. 3B, the heat collection portion 23 is deformed by a small deformation amount by bending processing to press the heat collection portion 23 toward the first wall 211. As a result, the temperature sensor 10 is held in a state of being pressed between the heat collection portion 23 and the first wall 211. The temperature sensor 10 is pressed against the wall 211 by the bending processing of the heat collection portion 23, and comes into contact with the coil 8 through the wall 211.

Since the wall 211 is present, the position of the temperature sensor 10 held by the bracket 20 is not shifted when the coil 8 is inserted into the inside of the clamping portion 21.

The following effects are achievable by the configuration in which the temperature sensor 10 is disposed between the heat collection portion 23 and the wall 211 of the metal bracket 20. Even when dimension accuracy of the outer shape of the temperature sensor 10 is varied, the heat can be collected to the thermosensitive region 10R of the temperature sensor 10 while pressing the temperature sensor 10 between the heat collection portion 23 and the wall 211 with appropriate pressure, based on high dimension accuracy of the heat collection portion 23 and the clamping portion 21 unique to the metal members. Such a configuration is particularly suitable for a case where a soft resin material is used for the protective member 12 of the temperature sensor 10 and the dimension is easily varied only by the single temperature sensor 10.

When no gap is present between the members conducting heat, the heat is more efficiently conducted from a heat source to the temperature sensor. This is because the heat can be conducted without through air inferior in thermal conductivity.

Accordingly, the temperature sensor 10 is preferably brought into contact with each of the wall 211 and the heat collection portion 23 without a gap. Likewise, the coil 8 is preferably brought into contact with each of the walls 211 and 212 of the clamping portion 21 without a gap.

In a case where a gap is present between the members, the gap is preferably filled with a resin material higher in thermal conductivity than the air, for example, an epoxy resin that is relatively high in thermal conductivity among resin materials.

Next, a method of assembling the temperature sensor 10 to the bracket 20 according to the present invention is described with reference to FIG. 3B.

In FIG. 3B, the shape of the heat collection portion 23 before the temperature sensor 10 is inserted is illustrated by an alternate long and two short dashes line. To facilitate insertion of the temperature sensor 10 between the heat collection portion 23 and the first wall 211, a clearance C2 between an end edge 231 of the heat collection portion 23 and the first wall 211 before the bending processing is set to be larger than a clearance C1 (also see FIG. 2B) between the heat collection portion 23 and the first wall 211 after the bending processing of the heat collection portion 23. After the temperature sensor 10 is inserted between the heat collection portion 23 and the first wall 211, the pressing force is applied to perform the bending processing of the heat collection portion 23 so as to eliminate the clearance C2. As a result, the heat collection portion 23 is displaced by spring back, and the clearance C1 is accordingly formed between the end edge 231 and the first wall 211.

In addition to the bending processing of the heat collection portion 23, caulking of the joining portion 22 described below is performed. As a result, the temperature sensor 10 is surely held by the bracket 20 so as to prevent the temperature sensor 10 from coming off from the heat collection portion 23 even if force is applied to the temperature sensor 10 in the axis direction.

To efficiently collect the heat from the coil 8 to the temperature sensor 10, the bending processing of the collection portion 23 can be performed so as not to form the clearance C1 between the end edge 231 of the heat collection portion 23 and the wall 211.

Note that the clearance C2 between the end edge 231 of the heat collection portion 23 and the first wall 211 may be widely secured more than the thickness of the temperature sensor 10, and the temperature sensor 10 may be inserted into the inside of the heat collection portion 23 from the clearance between the end edge 231 of the heat collection portion 23 and the wall 211. In this case, caulking pieces 221 and 222 of the joining portion 22 are opened at angles wider than angles illustrated by alternate long and two short dashes lines in FIG. 3A so as not to inhibit insertion of the temperature sensor 10.

(Joining Portion)

The joining portion 22 (FIG. 1 and FIG. 3A) is joined to the temperature sensor 10 by being caulked. The joining portion 22 is fixed to the temperature sensor 10 in a state of being plastically deformed by the applied pressing force.

The joining portion 22 according to the present embodiment includes the caulking pieces 221 and 222 that are paired protrusion pieces to be joined to the joined portion 12A of the temperature sensor 10.

The caulking pieces 221 and 222 communicate with the first wall 211 of the clamping portion 21, and are formed by being stamped integrally with the clamping portion 21 and the heat collection portion 23 from a metal plate.

Before the caulking, the caulking pieces 221 and 222 are opened in a direction in which front ends are separated from each other, for example, as illustrated by the alternate long and two short dashes lines in FIG. 3A. When the caulking pieces 221 and 222 are pressurized in the clamping direction D1 toward a base part 220 (also see FIG. 4B) of the joining portion 22, the caulking pieces 221 and 222 are plastically deformed in shapes illustrated by solid lines in FIG. 3A and crush the joined portion 12A in the thickness direction.

Note that the direction of the pressing force for caulking is not limited to the clamping direction D1, and the caulking pieces 221 and 222 may be pressurized in the other direction as long as the caulking pieces 221 and 222 are folded to positions to hold the joined portion 12A.

The front ends of the respective caulking pieces 221 and 222 according to the present embodiment are disposed at positions separated toward the outer peripheral side from the coil 8. This makes it possible to prevent the front ends of the caulking pieces 221 and 222 from scratching and damaging the surface of the coil 8.

Figure 4B:
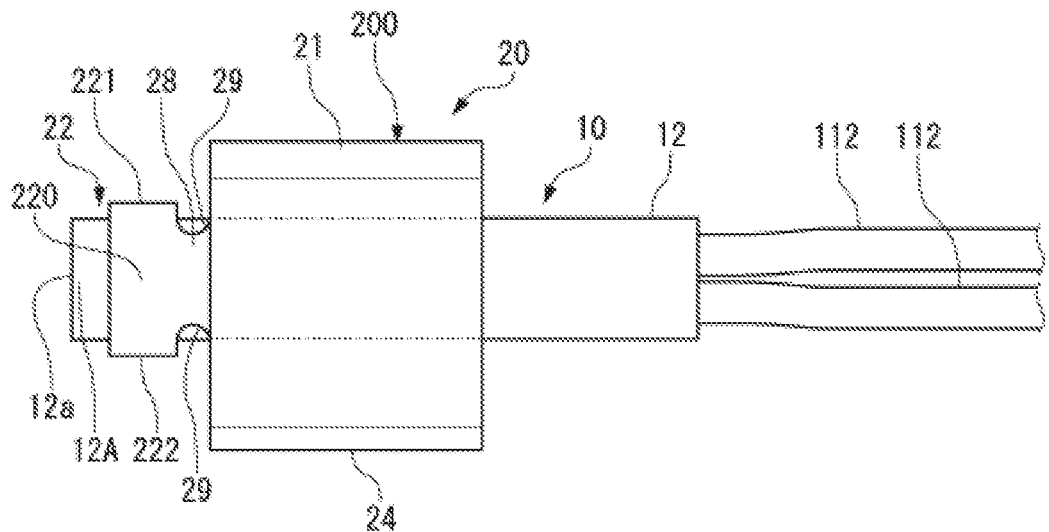
FIG. 4B is a side view illustrating the temperature detection device from a rear surface side in FIG. 4A.

As illustrated in FIG. 4B, the caulking pieces 221 and 222 are sectioned on the front side of the wall 211 by notches 29 that are provided on respective ends of the base part 220 of the joining portion 22 in a direction orthogonal to the front-rear direction D2. The caulking pieces 221 and 222 are supported in a cantilever manner from the wall 211 by a connection portion 28 that is a residual portion of the notches 29. Since the caulking pieces 221 and 222 protrude from the clamping portion 21, the caulking pieces 221 and 222 can be easily caulked to the joined portion 12A without being inhibited by the clamping portion 21.

The caulking pieces 221 and 222 according to the present embodiment extend with a width narrower than a length (dimension in front-rear direction D2) of the joined portion 12A, from the base part 220 toward the respective sides of the temperature sensor 10. The end edges on both sides in the width direction and the front end part of each of the caulking pieces 221 and 222 are pressed against the joined portion 12A.

The caulking pieces 221 and 222 are joined to the joined portion 12A by receiving pressing force larger than the pressing force when the thermosensitive region 10R is pressed by the heat collection portion 23. Since neither the thermosensitive body 101 nor the electric wires 110 are present in the joined portion 12A, the thermosensitive body 101 and the electric wires 110 are not damaged in caulking of the caulking pieces 221 and 222. In other words, joint by the caulking pieces 221 and 222 does not influence reliability of the thermosensitive element 11.

After the temperature sensor 10 is inserted into the inside of the heat collection portion 23, the heat collection portion 23 may be first pressed to temporarily fix the temperature sensor 10 and the caulking pieces 221 and 222 may be then caulked to the joined portion 12A, or the caulking pieces 221 and 222 may be first caulked to the joined portion 12A and the heat collection portion 23 may be then pressed. The caulking of the caulking pieces 221 and 222 and the pressing of the heat collection portion 23 may be simultaneously performed as a matter of course.

The temperature sensor 10 can be stably held over the entire length by the joining portion 22 including the caulking pieces 221 and 222, and the heat collection portion 23, and can be surely fixed against harsh vibration of a vehicle.

Typically, after the temperature sensor 10 is attached to the joining portion 22 and the heat collection portion 23 of the bracket 20, the bracket 20 is attached to a predetermined position of the extending portion 8A of the coil 8.

However, the temperature sensor 10 may be attached to the joining portion 22 and the heat collection portion 23 after the bracket 20 is attached to the coil 8.

Main Effects by Present Embodiment

The bracket 20 of the temperature detection device 1 described above is configured in a simple form as one member in which the portions such as the clamping portion 21 and the joining portion 22 are continuous, by the stamping and the bending processing using a metal plate material. When the bracket 20 having the simple form is used, the temperature sensor 10 can be held by the joining portion 22, and the coil 8 can be clamped inside the clamping portion 21. As a result, the temperature sensor 10 can be easily attached to the coil 8.

Since the bracket 20 has both of the function of clamping the coil 8 and the function of holding the temperature sensor 10, it is sufficient for the temperature detection device 1 to include only the bracket 20 to attach the temperature sensor 10 to the coil 8, in addition to the temperature sensor 10. Accordingly, the temperature detection device 1 does not include resin components that are disposed around the coil 8 and the temperature sensor 10 in the related art, at all. According to the present embodiment, the number of components can be reduced and the manufacturing cost of the temperature detection device 1 detecting the temperature of the coil 8 can be suppressed. The bracket 20 is easily shaped by press processing, and the temperature sensor 10 is easily assembled to the bracket 20 by caulking the joining portion 22. Since the joining portion 22 is caulked to the joined portion 12A that is set at the position different from the positions of the thermosensitive body 101 and the electric wires 110, the joining portion 22 does not damage the thermosensitive element 11. As a result, it is possible to easily manufacture the temperature detection device 1 while securing reliability of the temperature sensor 10.

In addition, the metal bracket 20 also has the function of collecting the heat of the coil 8 that is a temperature detection target, to the temperature sensor 10 because of the high thermal conductivity. The responsiveness of the temperature detection by the temperature sensor 10 can be improved based on the heat collection function.

In addition to the bracket main body 200 that mainly contributes to the heat collection to the temperature sensor 10, the whole of the bracket 20 including the joining portion 22 contributes to the heat collection to the temperature sensor 10 because the bracket 20 rapidly follows the temperature change of the coil 8 based on the thermal conductivity of the metal material.

Thus, according to the bracket 20 of the present embodiment, the temperature of the coil 8 can be detected with high responsiveness in the thermosensitive region 10R to which the heat is collected by the bracket main body 200 while the bracket 20 surely holds the temperature sensor 10 by the joined portion 12A that does not damage the thermosensitive element 11.

The bracket 20 according to the present embodiment includes the bracket main body 200 collecting heat to the temperature sensor 10 and the joining portion 22 joined to the temperature sensor 10, as different portions separated in the longitudinal direction of the temperature sensor 10. Thus, the portions can be formed in the respective forms most appropriate to the heat collection and the holding.

The responsiveness of the temperature detection device 1 is described with a result of a test for a thermal time constant τ. The thermal time constant τ is a required time until the temperature of the thermosensitive body 101 is changed to 63.2% of initial temperature difference.

In a comparative example 1 compared with the present embodiment, a metal member such as the bracket 20 is not provided around the temperature sensor 10. In the temperature sensor 10 according to the comparative example 1, the protective member 12 covering the thermosensitive element 11 is exposed.

The temperature sensor according to the comparative example 1 left in a room temperature was pressed against a metal plate heated to 100° C. simulating the coil in use, and the thermal time constant τ was measured. The thermal time constant τ was 90 seconds.

In contrast, the thermal time constant τ measured when the first wall 211 of the bracket 20 of the temperature detection device 1 according to the present embodiment was pressed against a metal plate heated to 100° C. was 20 seconds.

The thermosensitive element 11 had the same size, and the thermosensitive body 101 had the length of about 4 mm in both of the comparative example 1 and the present embodiment.

In a comparative example 2, the thermosensitive body 101 had the length of about 2 mm, and the metal member was not provided as with the comparative example 1. Typically, the responsiveness of the thermosensitive body 101 can be improved when the thermosensitive body 101 is designed in a small shape.

As with the comparative example 1, the thermal time constant τ was measured in the comparative example 2. The thermal time constant τ was 23 seconds.

It is found from comparison between the comparative examples 1 and 2 and the present embodiment that the heat collection action by the bracket 20 largely contributes to improvement of the responsiveness more than the dimensional difference (about 2 mm) of the thermosensitive body between the comparative examples 1 and 2.

The thermal time constants τ in the comparative examples 1 and 2 and the present embodiment are summarized in the following table.

TABLE 1

| | Thermal Time Constant τ | Dimension of Thermosensitive Body |
|---|---|---|
| Present Embodiment | 20 seconds | about 4 mm |
| Comparative Example 1 | 90 seconds | about 4 mm |
| Comparative Example 2 | 23 seconds | about 2 mm |

In the above-described embodiment, both of the clamping portion 21 and the heat collection portion 23 are disposed over the thermosensitive region 10R along the front-rear direction D2; however, both of the clamping portion 21 and the heat collection portion 23 are not necessarily disposed over the thermosensitive region 10R.

As described above, however, the thermal responsiveness of the temperature sensor 10 is improved due to heat transfer to the temperature sensor 10 also from the heat collection portion 23 side that is a side opposite to the coil 8 side, as a main factor.

Therefore, at least the heat collection portion 23 out of the clamping portion 21 and the heat collection portion 23 is preferably disposed over the thermosensitive region 10R.

The dimension of each of the clamping portion 21 and the heat collection portion 23 in the front-rear direction D2 can be appropriately determined in consideration of the heat collection to the temperature sensor 10, stable holding of the temperature sensor 10, and the like.

(First Modification)

Figure 6A:
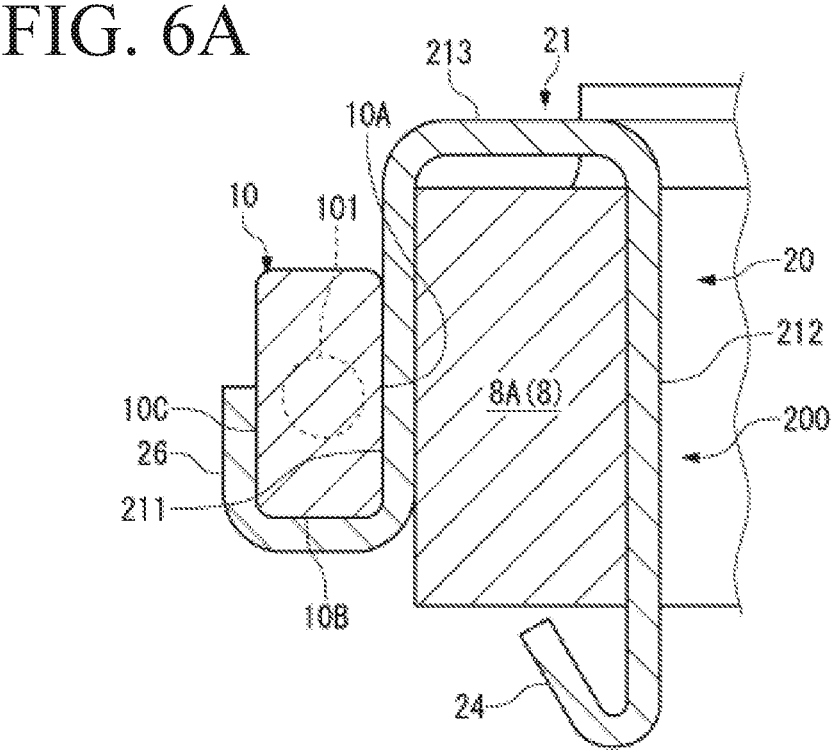
FIGS. 6A and 6B are diagrams illustrating a first modification of a heat collection portion of a bracket main body.

Unlike the above-described embodiment, a heat collection portion 26 may be disposed only on two side surfaces 10B and 10C of the temperature sensor 10 as illustrated in FIG. 6A. Also in this case, the heat collection portion 26 is thermally coupled to the thermosensitive region 10R because the thermosensitive region 10R is disposed between the wall 211 and the heat collection portion 26 protruding to the outside of the clamping portion 21. Accordingly, the heat from the coil 8 is collected to the temperature sensor 10 not only from the coil 8 side but also from the heat collection portion 26 side.

Figure 6B:
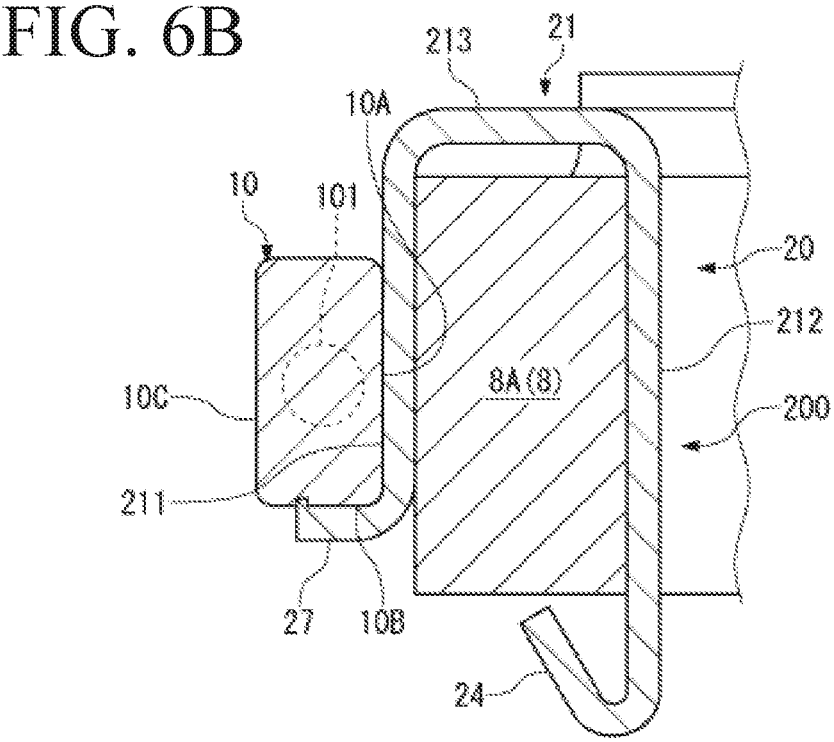

Further, as illustrated in FIG. 6B, a heat collection portion 27 may be disposed only on the surface 10B orthogonal to the surface 10A of the temperature sensor 10, and the heat collection portion 27 may be thermally coupled to the thermosensitive region 10R. Also in this case, the heat from the coil 8 is collected to the temperature sensor 10 not only from the coil 8 side but also from the heat collection portion 27 side.

In other words, it is not necessary for the heat collection portion collecting the heat to the temperature sensor 10 to surround the temperature sensor 10 around the axis line and to clamp the temperature sensor 10 between different portions (23 and 211) of the heat collection portion. So long as the heat collection portion protrudes to outside of the clamping portion 21, is disposed along the portion (e.g., 10B and 10C) different from the portion (10A) of the temperature sensor 10 facing the coil 8, and is thermally coupled to the temperature sensor 10, as with the heat collection portions 23, 26, and 27, the heat collection portion can contribute to the heat collection to the temperature sensor 10. Even when the temperature sensor 10 has a shape different from the shape described in the above-described embodiment, for example, a cylindrical shape, the heat collection portion can contribute to the heat collection to the temperature sensor 10 as long as the heat collection portion protrudes to outside of the clamping portion 21 and is thermally coupled to the temperature sensor 10.

It is not necessary for the heat collection portion to hold the temperature sensor 10. In this case, the temperature sensor 10 may be held by the bracket main body 200 by being bonded to the first wall 211.

(Second Modification)

Figure 7A:
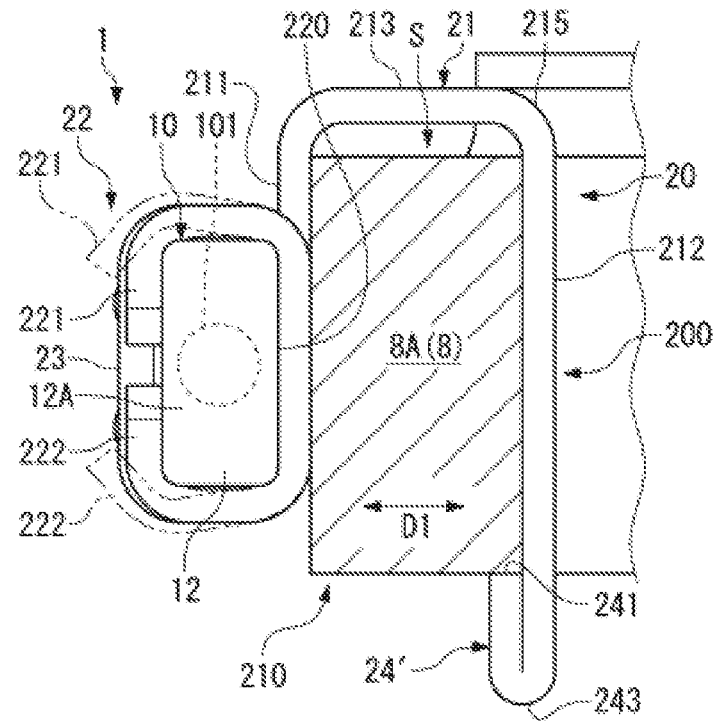
FIGS. 7A and 7B are diagrams illustrating a second modification of the stopper of the bracket.
Figure 7B:
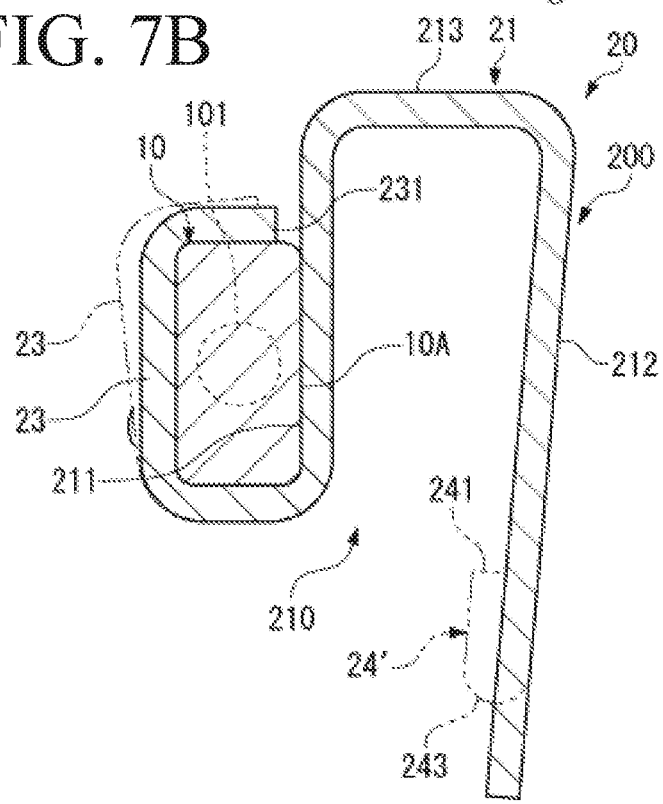

FIGS. 7A and 7B illustrate a stopper 24' that is different in shape from the stopper 24 according to the above-described embodiment. The stopper 24' is formed by bending one end side of the second wall 212 toward the first wall 211 side and overlapping both sides of a bent portion 243. In FIG. 7B, the second wall 212 before bending is illustrated by a solid line. After the coil 8 is inserted into the inside of the clamping portion 21, the second wall 212 is bent by 180 degrees as illustrated by an alternate long and two short dashes line to form the stopper 24', and the end part 241 of the stopper 24' can abut on the coil 8.

The stopper 24' also can regulate separation of the coil 8 from the clamping portion 21 by the end part 241 facing the coil 8.

(Third Modification)

Figure 8A:
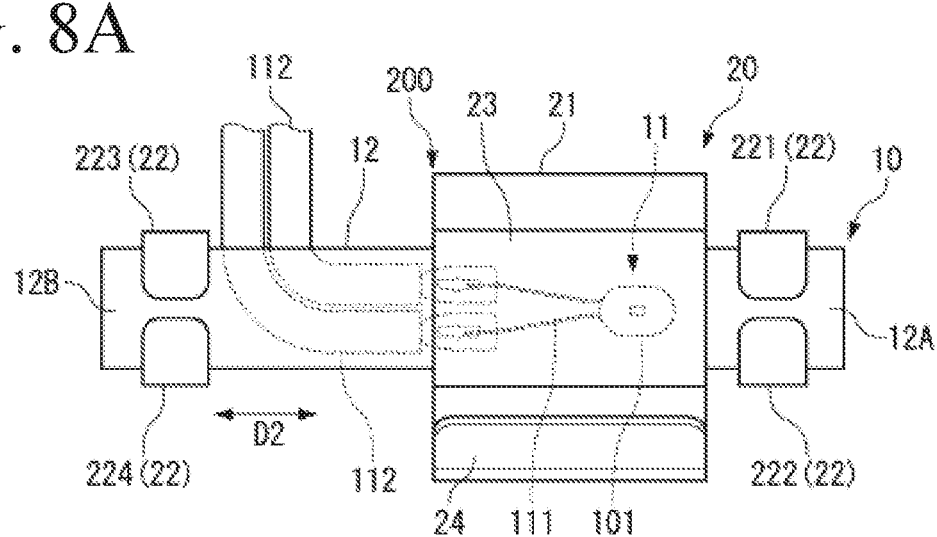
FIG. 8A is a diagram illustrating a third modification of a position of a joined portion of the temperature sensor.

FIG. 8A illustrates an example in which a joined portion 12B is set also at a rear end part of the protective member 12 of the temperature sensor 10.

In the example illustrated in FIG. 8A, the lead wires 112 are drawn out from the protective member 12 in a direction orthogonal to the front-rear direction D2. Therefore, the lead wires 112 are not present at the joined portion 12B of the protective member 12. Caulking pieces 223 and 224 supported rearward in a cantilever manner from the heat collection portion 23 are joined to the joined portion 12B. The temperature sensor 10 may be held only by the caulking pieces 223 and 224 and the heat collection portion 23. In this case, the caulking pieces 221 and 222 are unnecessary, and it is unnecessary to provide the joined portion 12A so as to be located anterior to the thermosensitive body 101.

(Fourth Modification)

Figure 8B:
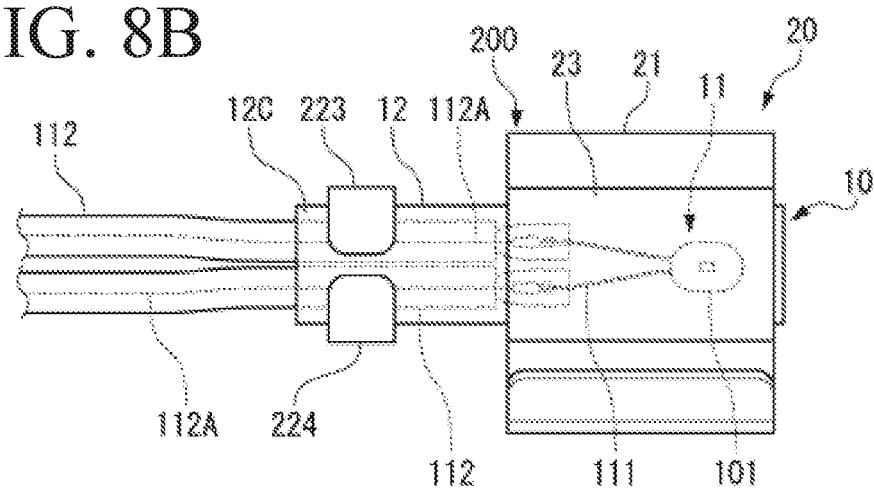
FIG. 8B is a diagram illustrating a fourth modification of the position of the joined portion of the temperature sensor.

FIG. 8B illustrates a case where a region for joint cannot be provided on the front end side of the temperature sensor 10 for reasons of an installation space or manufacture of the temperature detection device 1. In this example, the temperature sensor 10 is held only by a joined portion 12C provided on the rear end side of the temperature sensor 10 and the heat collection portion 23. The lead wires 112 are located at the joined portion 12C. The caulking pieces 223 and 224 can be joined to the joined portion 12C without damaging the lead wires 112 (in particular, core wires 112A) depending on rigidity of the lead wires 112. Therefore, the bracket 20 may be joined to the joined portion 12C where the electric wires 110 are located as illustrated in FIG. 8B.

In a case where there is no concern about damage of the thermosensitive body 101 because of rigidity, the bracket 20 may be joined to the protective member 12 at the position of the thermosensitive body 101.

(Fifth Modification)

Figure 8C:
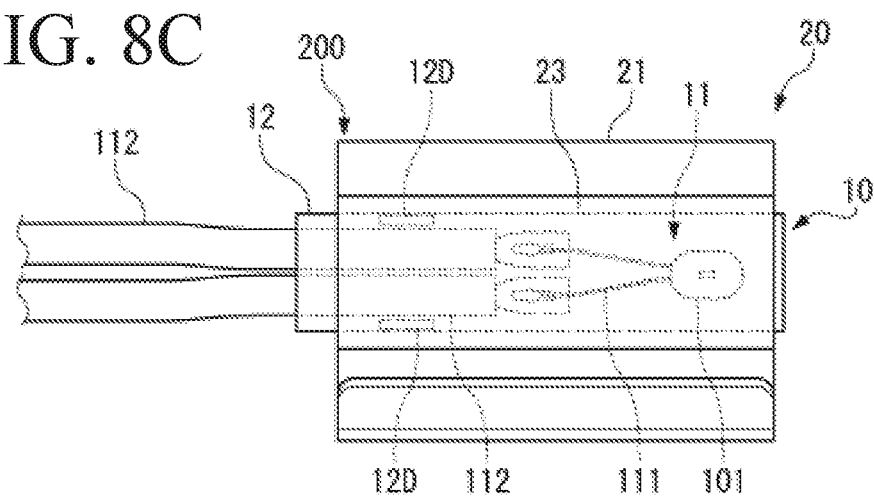
FIG. 8C is a diagram illustrating a fifth modification in which the bracket main body is joined to the temperature sensor.

FIG. 8C illustrates an example in which the bracket main body 200 is joined to joined portions 12D, 12D of the temperature sensor 10. In this example, the lead wires 112 are covered with the bracket main body 200. The bracket main body 200 is caulked to the joined portions 12D, 12D located outside the respective lead wires 112.

(Sixth Modification)

Figure 9A:
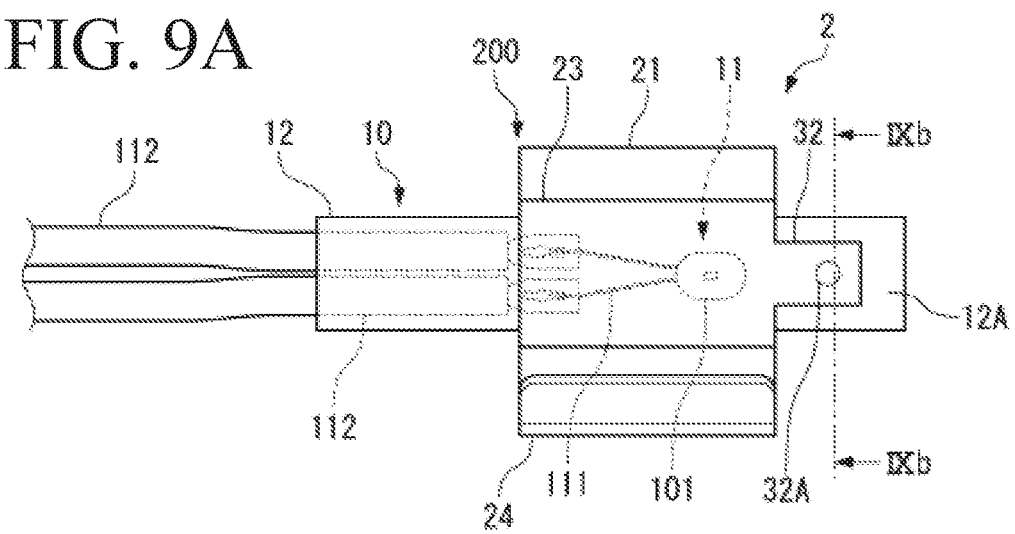
FIGS. 9A and 9B are diagrams illustrating a sixth modification of joint between the temperature sensor and the bracket, FIG. 9B being a cross-sectional view taken along a line IXb-IXb in FIG. 9A.
Figure 9B:
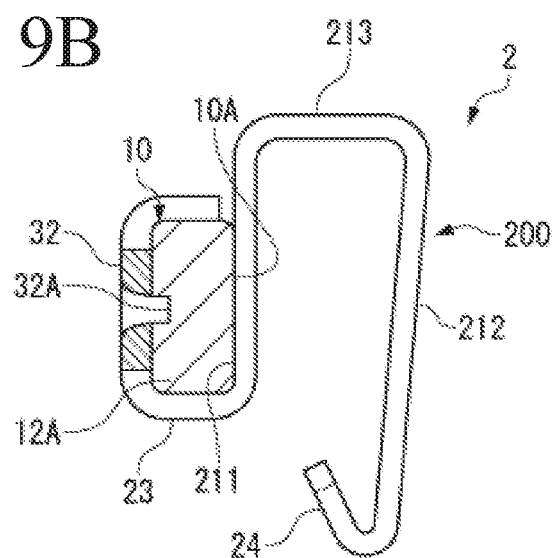

FIGS. 9A and 9B illustrate a temperature detection device 2 according to a modification relating to joint between the temperature sensor 10 and the bracket 20. In an example illustrated in FIGS. 9A and 9B, a tab 32 that serves as a joining portion extending forward from the heat collection portion 23 is caulked to the joined portion 12A of the temperature sensor 10. The tab 32 is provided with a concave part 32A corresponding to an unillustrated punch used in caulking.

(Seventh Modification)

Figure 10A:
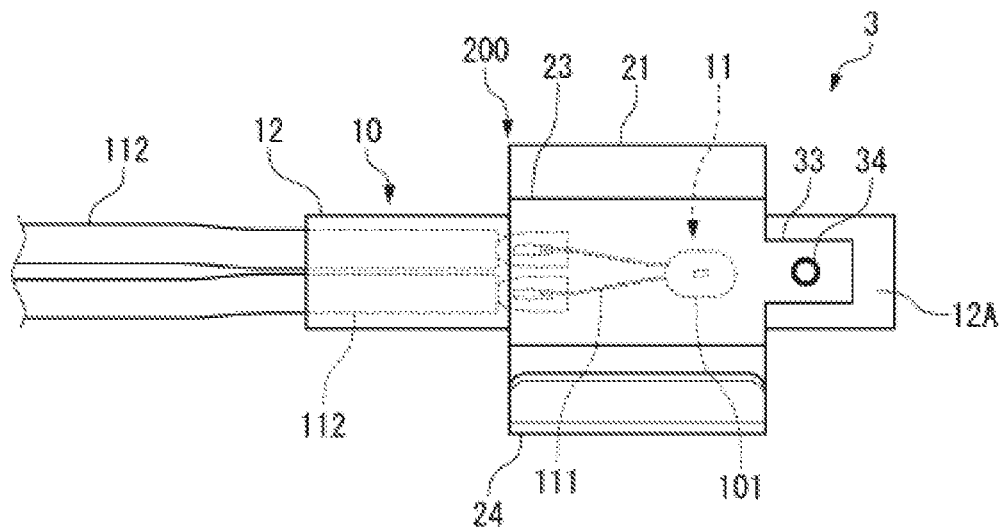
FIG. 10A is a diagram illustrating a seventh modification of the joint between the temperature sensor and the bracket.

FIG. 10A illustrates a temperature detection device 3 according to another modification relating to the joint between the temperature sensor 10 and the bracket 20. As illustrated in FIG. 10A, a tab 33 extending from the heat collection portion 23 may be caulked to the joined portion 12A by a rivet 34. The rivet 34 penetrates through the tab 33 and the joined portion 12A.

(Eighth Modification)

Figure 10B:
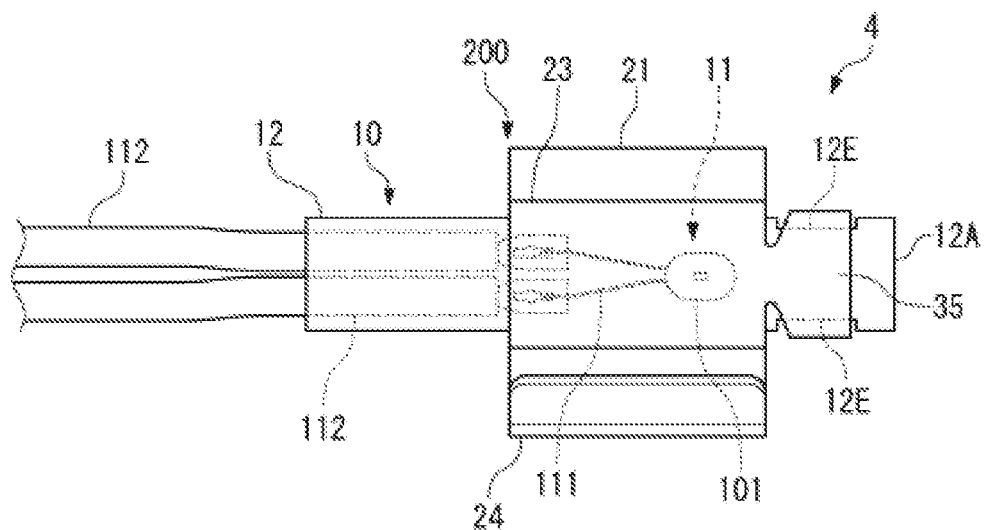
FIG. 10B is a diagram illustrating an eighth modification.

FIG. 10B illustrates a temperature detection device 4 according to still another modification also relating to the joint between the temperature sensor 10 and the bracket 20. In this example, an engagement protrusion 35 connected to the heat collection portion 23 is inserted into grooves 12E provided on respective sides in the height direction D3 of the joined portion 12A in a state of being elastically deformed in the height direction D3 of the joined portion 12A. As described above, the bracket 20 may be joined to the temperature sensor 10 by engagement of the engagement protrusion 35 with the joined portion 12A by elastic force.

The temperature sensor 10 and the bracket 20 may be joined by the other appropriate method.

The above-described first to eighth modifications are also applicable to second to fourth embodiments described below.

Figure 17:
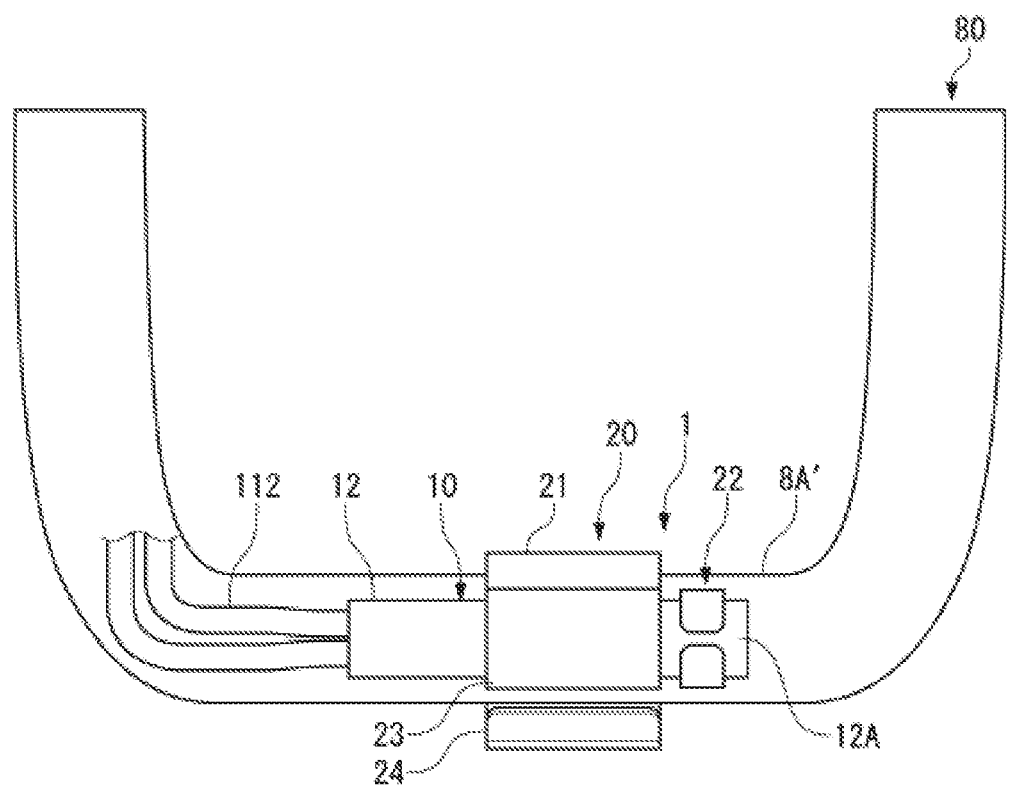
FIG. 17 is a diagram illustrating an assembly including a coil element and the temperature detection device.

As illustrated in FIG. 17, the temperature detection device 1 may be provided as an assembly previously assembled to a coil element 80 including an extending portion 8A'. In this case, the coil element 80 as the assembly may be assembled to the other portion of the coil 8 at a recipient.

This is true of a temperature detection device 5 according to the second embodiment, a temperature detection device 6 according to the third embodiment, and a temperature detection device 7 according to the fourth embodiment.

Second Embodiment

Next, the second embodiment of the present invention is described with reference to FIGS. 11A, 11B and FIGS. 12A, 12B.

In the following, matters different from the first embodiment are mainly described. Components similar to the components according to the first embodiment are denoted by the same reference numerals.

Figure 11A:
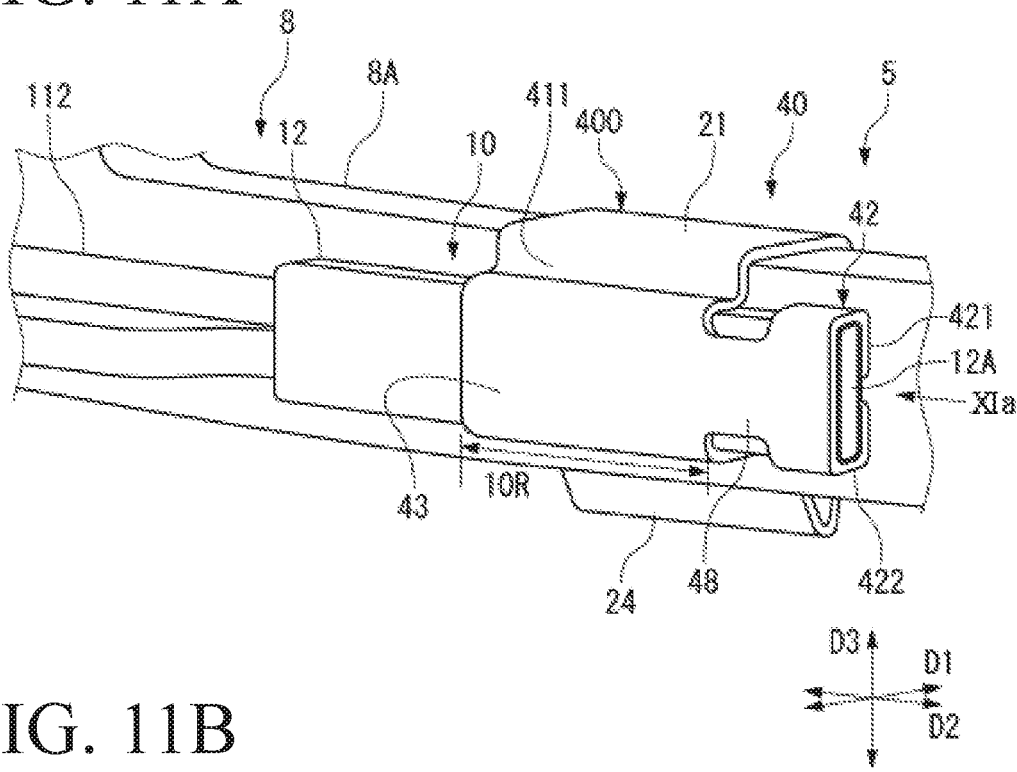
FIGS. 11A and 11B are perspective views illustrating a temperature detection device and a coil according to a second embodiment, FIG. 11A illustrating appearance of the temperature detection device, and FIG. 11B also illustrating a thermosensitive body and electric wires in a temperature sensor of the temperature detection device.
Figure 11B:
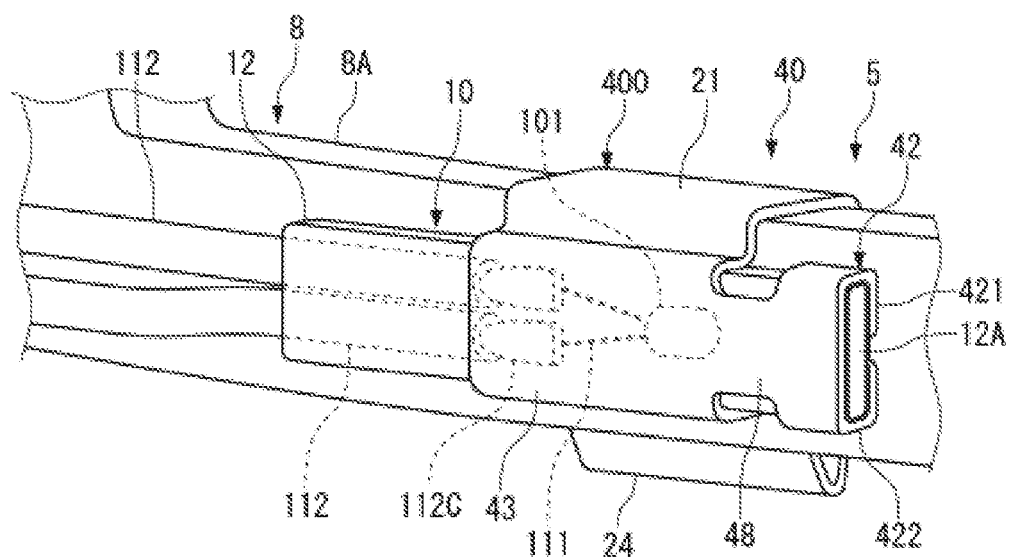

As illustrated in FIGS. 11A and 11B, the temperature detection device 5 according to the second embodiment includes the temperature sensor 10 and a bracket 40 that attaches the temperature sensor 10 to the extending portion 8A of the coil 8.

The bracket 40 includes a bracket main body 400 that clamps the coil 8 and the temperature sensor 10 by elastic force, and a joining portion 42 joined to the temperature sensor 10.

The coil 8 and the temperature sensor 10 are pressed in the clamping direction D1 by the elastic force of the bracket main body 400.

Figure 12A:
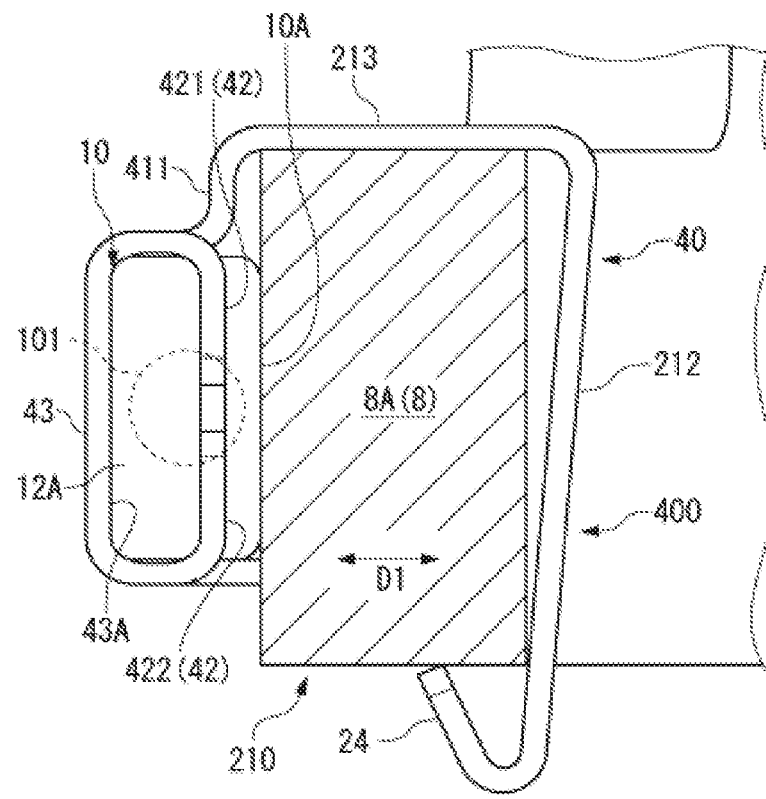
FIG. 12A is a diagram illustrating the temperature detection device and the coil from a direction of an arrow XIa in FIG. 11A, in which the coil is broken away.

As illustrated in FIG. 12A, the bracket main body 400 includes a first wall 411, the second wall 212, and the coupling portion 213.

In the second embodiment, the temperature sensor 10 is disposed between the first wall 411 of the bracket main body 400 and the coil 8.

Figure 12B:
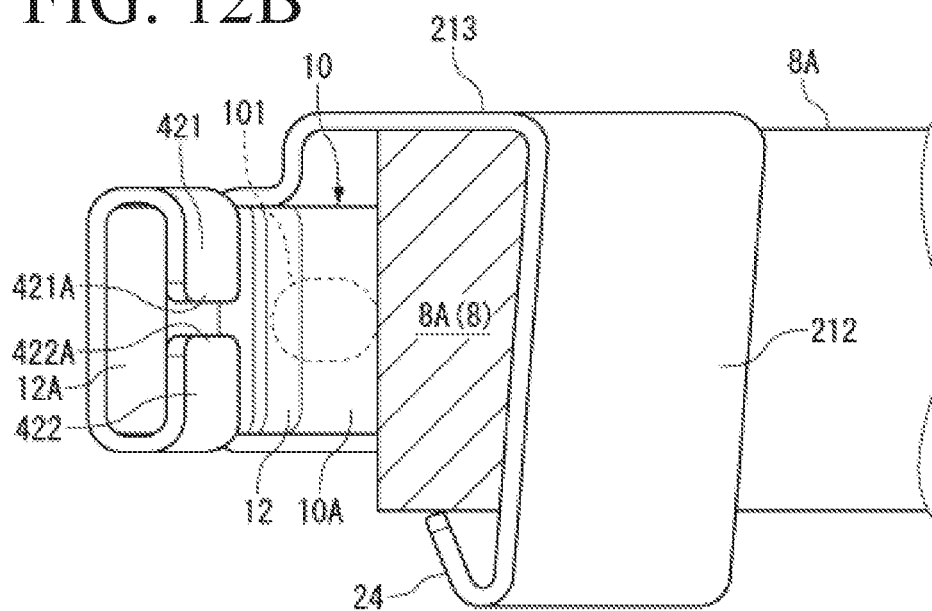
FIG. 12B is a perspective view of the temperature detection device illustrated in FIG. 12A.

In the second embodiment, the coil 8 and the temperature sensor 10 are both disposed inside the bracket main body 400. As illustrated in FIGS. 12A and 12B, the coil 8 and the temperature sensor 10 come into direct contact with each other without through a member. Accordingly, the heat is directly conducted from the coil 8 to the temperature sensor 10. This further contributes to improvement of responsiveness.

In the first embodiment, a hole or a notch may be provided in the wall 211 (FIG. 3A), and the surface 10A of the temperature sensor 10 may be brought into direct contact with the coil 8 through the hole or the notch, as with the second embodiment.

The bracket main body 400 includes a supporting portion 43 supporting the temperature sensor 10. The supporting portion 43 is provided on the wall 411, and is bent along three side surfaces of the temperature sensor 10. As illustrated in FIG. 12A, the supporting portion 43 has a rectangular cross-section corresponding to the outer shape of the temperature sensor 10. The temperature sensor 10 is housed in a groove 43A sectioned inside the supporting portion 43, from the inside of the bracket main body 400. The surface 10A of the temperature sensor 10 exposed from the groove 43A comes into contact with the side surface of the coil 8 inserted into the inside of the bracket main body 400 from the opening 210.

It is not necessary for the bracket main body 400 to include the supporting portion 43 as long as the bracket main body 400 can support the temperature sensor 10. For example, even when the wall 411 of the bracket main body 400 is formed flat, the temperature sensor 10 may be bonded to and supported by the wall 411.

As illustrated in FIG. 11A and FIG. 12A, the joining portion 42 communicates with the wall 411, and includes caulking pieces 421 and 422 that are paired protrusion pieces supported in a cantilever manner on the front side of the wall 411 by a connection portion 48 (FIG. 11A). The caulking pieces 421 and 422 of the joining portion 42 are caulked to the joined portion 12A of the temperature sensor 10.

To facilitate work to caulk the caulking pieces 421 and 422, and to avoid front ends 421A and 422A (FIG. 12B) of the respective caulking pieces 421 and 422 from contacting with the coil 8, the joined portion 12A of the temperature sensor 10 is made thinner than the joined portion 12A according to the first embodiment (FIG. 3A). This is to form a space on the coil 8 side of the joined portion 12A.

Also in the present embodiment, the temperature sensor 10 is surrounded by the bracket main body 400 clamping the coil 8 around the axis line, and the bracket 40 is thermally coupled to the temperature sensor 10. Therefore, the heat of the coil 8 is collected to the temperature sensor 10 by heat conduction through the bracket 40.

According to the present embodiment, since the temperature sensor 10 disposed in the same space of the bracket main body 400 in which the coil 8 is housed comes into direct contact with the coil 8, it is possible to further contribute to improvement of the responsiveness of the temperature detection by the temperature sensor 10.

Also in the present embodiment, the bracket main body 400 is preferably disposed over the thermosensitive region 10R (FIG. 11A) that is set so as to include the thermosensitive body 101 and the Dumet wires 111, in consideration of contribution to the heat conduction to the thermosensitive body 101. In the thermosensitive region 10R where the temperature sensor 10 is covered with the bracket main body 400, it is possible to prevent splash of the cooling liquid from directly adhering to the temperature sensor 10 while collecting the heat of the coil 8 to the temperature sensor 10.

It is not necessary that the coil 8 and the temperature sensor 10 clamped by the bracket main body 400 are pressed against each other. For example, the temperature sensor 10 located on the coupling portion 231 side and the coil 8 located on the opening 210 side may be disposed adjacently to each other inside the bracket main body 400.

Third Embodiment

Next, the third embodiment of the present invention is described with reference to FIGS. 13A, 13B and FIG. 14.

In the following, matters different from the first embodiment are mainly described. Components similar to the components according to the first embodiment are denoted by the same reference numerals.

Figure 13A:
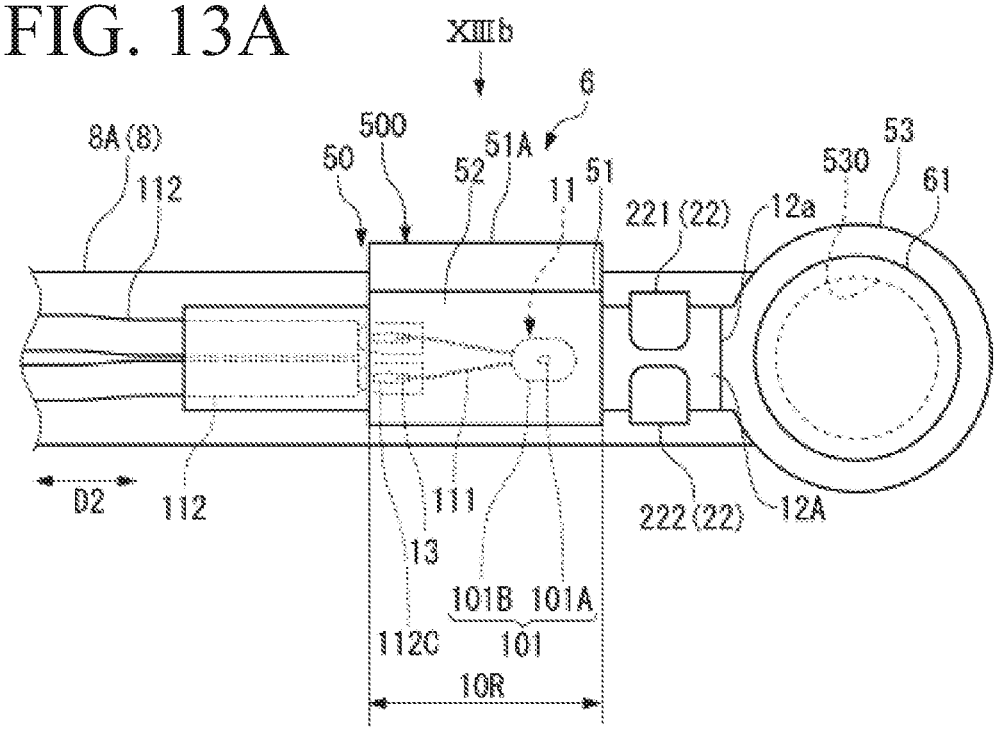
FIG. 13A is a side view illustrating a temperature detection device and a coil according to a third embodiment.
Figure 13B:
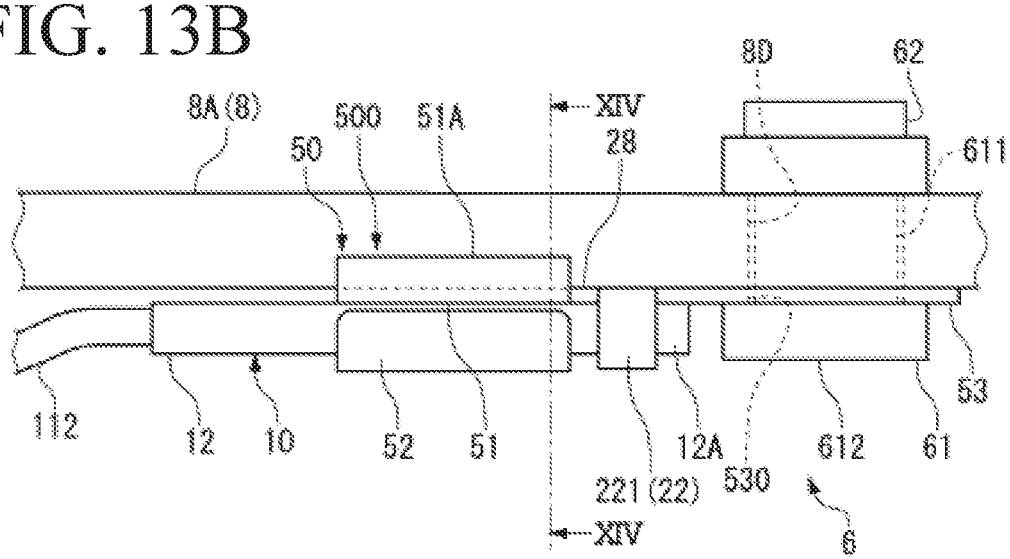
FIG. 13B is a plan view illustrating the temperature detection device and the coil from a direction of an arrow XIIIb in FIG. 13A.

As illustrated in FIGS. 13A and 13B, the temperature detection device 6 according to the third embodiment includes the temperature sensor 10 and a metal bracket 50 that attaches the temperature sensor 10 to the extending portion 8A of the coil 8.

The third embodiment is different from the first embodiment and the second embodiment in that the bracket 50 is fastened to the coil 8 by a bolt 61 and a nut 62 as fastening members. In the third embodiment, the coil 8 is not clamped by the bracket 50. In the third embodiment, the bracket 50 holding the temperature sensor 10 is fastened to the coil 8. As a result, the temperature sensor 10 is attached to the coil 8.

[Bracket]

The bracket 50 includes a bracket main body 500 that is disposed over the thermosensitive region 10R of the temperature sensor 10 and is thermally coupled to the temperature sensor 10, the joining portion 22 joined to the temperature sensor 10, and a fastened portion 53 fastened to the coil 8.

The bracket 50 according to the third embodiment also has a configuration in which components, namely, the bracket main body 500, the joining portion 22, and the fastened portion 53 are integrally made of one metal plate, as with the bracket 20 according to the first embodiment and the bracket 40 according to the second embodiment.

(Bracket Main Body)

The bracket main body 500 includes a heat transfer portion 51 that transfers heat generated from the coil 8 to the temperature sensor 10, and a heat collection portion 52 that communicates with the heat transfer portion 51 and is thermally coupled to the thermosensitive region 10R of the temperature sensor 10.

Figure 14:
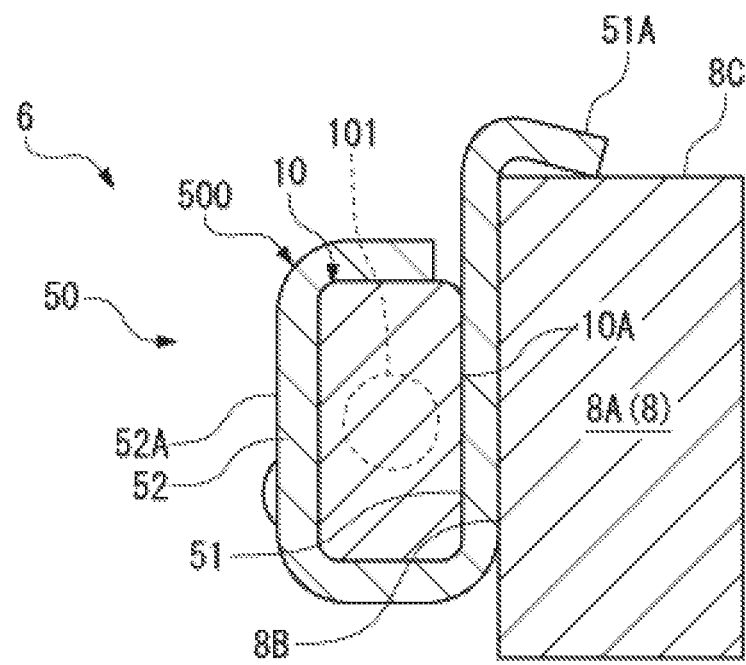
FIG. 14 is a cross-sectional view of the temperature detection device taken along a line XIV-XIV in FIG. 13B.

As illustrated in FIG. 14, the heat transfer portion 51 is formed in a rectangular plate shape interposed between the one surface 10A of the temperature sensor 10 and one surface 8B of the coil 8. The heat transfer portion 51 is disposed over the thermosensitive region 10R (FIG. 13A) that includes at least the thermosensitive body 101 of the temperature sensor 10.

A rotation regulation piece 51A that is bent to the heat transfer portion 51 and faces another surface 8C (FIG. 14) of the coil 8 is connected to one end side of the heat transfer portion 51.

The rotation regulation piece 51A regulates rotation of the bracket 50 and the temperature sensor 10 to the coil 8 around an axis of the bolt 61 (FIGS. 13A and 13B). The rotation regulation piece 51A also contributes to heat transfer from the coil 8 to the temperature sensor 10. Further, since the bracket 50 is positioned to the coil 8 by the rotation regulation pieces 51A, a shaft part 611 (FIG. 13B) of the bolt 61 can be easily inserted into the fastened portion 53 and the coil 8.

In a case where another means to regulate relative rotation of the coil 8 and the bracket 50 is provided, it is sufficient for the bracket main body 500 to include at least only the heat transfer portion 51. For example, a key and a key groove locking the key are provided on the bracket 50 and the coil 8, which makes it possible to regulate the relative rotation of the bracket 50 and the coil 8. Note that, in a form illustrated in FIG. 15 described below, the rotation regulation piece 51A is not provided.

When the coil 8 side of the heat transfer portion 51 is defined as "inside" and the temperature sensor 10 side of the heat transfer portion 51 is defined as "outside", the heat collection portion 52 (FIGS. 13A and 13B, and FIG. 14) protrudes to outside of the heat transfer portion 51, and is thermally coupled to the temperature sensor 10. When the heat collection portion 52 is thermally coupled to the temperature sensor 10, the heat can be transferred from the heat collection portion 52 to the temperature sensor 10, and collected to the temperature sensor 10. The heat collection portion 52 communicates with the heat transfer portion 51, and supports the temperature sensor 10 outside the heat transfer portion 51.

As illustrated in FIG. 14, the heat collection portion 52 is formed by bending the other end side of the heat transfer portion 51 along the surface of the temperature sensor 10. The temperature sensor 10 is clamped between the heat transfer portion 51 and the heat collection portion 52. More specifically, the temperature sensor 10 is disposed between the heat transfer portion 51 and a facing portion 52A (FIG. 14) of the heat collection portion 52 facing the heat transfer portion 51.

The heat collection portion 52 according to the present embodiment is configured in a manner similar to the heat collection portion 23 (FIG. 3B) according to the first embodiment. The heat collection portion 52 may be configured in a manner similar to the heat collection portion 26 illustrated in FIG. 6A or the heat collection portion 27 illustrated in FIG. 6B.

The heat is transferred to the temperature sensor 10 not only from the one surface 10A (FIG. 14) side facing the coil 8 but also from the other surfaces (surfaces other than the one surface 10A) abutting on the bracket 50 in the temperature sensor 10, through the bracket 50 because of high thermal conductivity of the metal bracket 50. In other words, when the heat of the coil 8 is collected to the temperature sensor 10 by the bracket 50, the temperature sensor 10 detects the temperature of the coil 8 without delay from the temperature change of the coil 8, which makes it possible to improve responsiveness of temperature detection.

(Joining Portion)

The joining portion 22 (FIGS. 13A and 13B) is caulked to and joined to the temperature sensor 10 on one side in the front-rear direction D2 that is a longitudinal direction of the bracket main body 500.

The caulking pieces 221 and 222 of the joining portion 22 are formed by stamping integrally with the heat transfer portion 51, the heat collection portion 52, and the fastened portion 53 from a metal plate.

The caulking pieces 221 and 222 according to the present embodiment are bent to the outside of the coil 8, and respective front ends of the caulking pieces 221 and 222 are disposed at positions separated outward from the coil 8. Alternatively, as with the caulking pieces 421 and 422 illustrated in FIGS. 11A, 11B and FIGS. 12A 12B, the caulking pieces 221 and 222 may be bent toward the inside of the coil 8.

The joining portion 22 is joined to the joined portion 12A of the temperature sensor 10 not provided with the thermosensitive body 101 and the electric wires 110, as with the first embodiment. The joined portion 12A protrudes forward from the bracket main body 500.

(Fastened Portion)

The fastened portion 53 is fastened to the coil 8 by the bolt 61 and the nut 62 (FIG. 13B) attached to the bolt 61. The fastened portion 53 includes a through hole 530 that communicates with the front side of the joining portion 22 and penetrates the fastened portion 53 in a thickness direction.

The fastened portion 53 according to the present embodiment is located on an extension extending in the front-rear direction D2 from the temperature sensor 10 held by the bracket 50.

In the third embodiment, the bracket main body 500 including the heat transfer portion 51 and the heat collection portion 52, the joining portion 22, and the fastened portion 53 are disposed in order from the rear side to the front side in the front-rear direction D2 of the temperature sensor 10.

When the shaft part 611 (FIG. 13B) of the bolt 61 is inserted into the through hole 530 and a hole 8D penetrating through the coil 8, and the nut 62 is fastened to the front end side of the shaft part 611, the bracket 50 and the coil 8 are fastened between a head part 612 of the bolt 61 and the nut 62.

The fastened portion 53 is formed flat along the surface of the linear extending portion 8A according to the present embodiment. The fastened portion 53 and the heat transfer portion 51 are located on the same plane.

The fastened portion 53 has an annular shape around the circular through hole 530. However, so long as the fastened portion 53 can be fastened by the bolt 61 that has the shaft part 611 inserted into the through hole 530, it is not necessary for the fastened portion 53 to have an annular shape.

The bracket 50 and the coil 8 can be fastened by a rivet in place of the bolt 61 and the nut 62.

Effects by Third Embodiment

According to the third embodiment, the bracket 50 has a simple configuration in which the portions such as the bracket main body 500, the joining portion 22, and the fastened portion 53 are continued as one member by stamping and bending processing using a metal plate member. Using the bracket 50 having the simple configuration makes it possible to hold the temperature sensor 10 by the joining portion 22, and to fasten the fastened portion 53 to the coil 8, thereby easily attaching the temperature sensor 10 to the coil 8. The bracket 50 can be easily shaped by press processing, and the bracket 50 can be easily assembled to the temperature sensor 10 by caulking of the joining portion 22. Since the joining portion 22 is caulked to the joined portion 12A that is provided at the position different from the thermosensitive body 101 and the electric wires 110, the thermosensitive element 11 is not damaged. Accordingly, it is possible to easily manufacture the temperature detection device 6 while securing reliability of the temperature sensor 10.

In addition, the metal bracket 50 also has the function of collecting the heat of the coil 8 that is a temperature detection target, to the temperature sensor 10 because of the high thermal conductivity. The responsiveness of the temperature detection by the temperature sensor 10 can be improved based on the heat collection function.

In addition to the bracket main body 500 that mainly contributes to the heat collection to the temperature sensor 10, the whole of the bracket 50 including the joining portion 22 and the fastened portion 53 rapidly follows the temperature change of the coil 8 based on the thermal conductivity of the metal material. This contributes to the heat collection to the temperature sensor 10.

Thus, according to the bracket 50 of the present embodiment, the temperature of the coil 8 can be detected with high responsiveness in the thermosensitive region 10R to which the heat is collected by the bracket main body 500 while the bracket 50 surely holds the temperature sensor 10 by the joined portion 12A that does not damage the thermosensitive element 11.

The bracket 50 according to the present embodiment includes the bracket main body 500 collecting the heat to the temperature sensor 10, the joining portion 22 joined to the temperature sensor 10, and the fastened portion 53 fastened to the coil 8, as different portions separated in the longitudinal direction of the temperature sensor 10. Thus, the portions can be formed in the respective forms most appropriate to the heat collection, the holding, and the fixing.

The various forms of the joining portion 22 of the bracket joined to the temperature sensor 10, described with reference to FIGS. 8A, 8B, 8C to FIGS. 10A, 10B are also applicable to the third embodiment.

For example, in the third embodiment, in a case where the caulking pieces 221 and 222 of the joining portion 22 are located posterior to the bracket main body 500 as illustrated in FIG. 8B, the fastened portion 53 may be connected to the front end of the bracket main body 500.

Also in the third embodiment, the temperature sensor 10 is surrounded around the axis line by the heat transfer portion 51 and the heat collection portion 52 of the bracket main body 500. Therefore, the heat of the coil 8 is efficiently collected to the temperature sensor 10 by the heat conduction through the bracket 50.

Further, in the thermosensitive region 10R where the temperature sensor 10 is covered with the bracket main body 500, it is possible to prevent splash of the cooling liquid from directly adhering to the temperature sensor 10 while collecting the heat of the coil 8 to the temperature sensor 10.

Modification of Third Embodiment

The position of the fastened portion 53 is not limited on the extension extending from the temperature sensor 10 in the front-rear direction D2.

Figure 15:
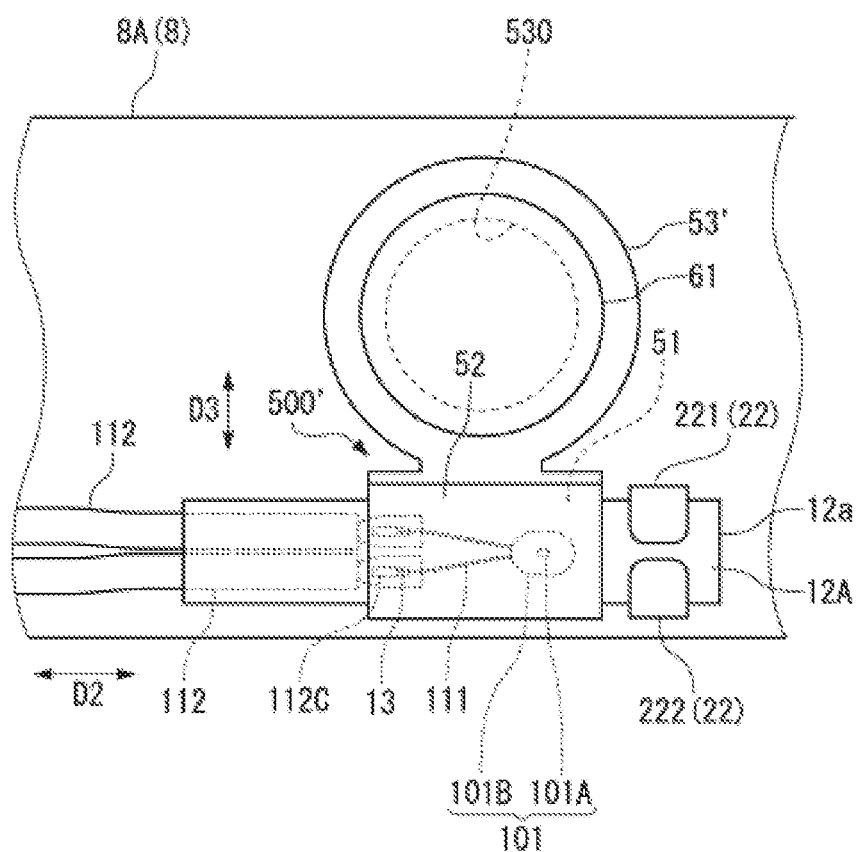
FIG. 15 is a side view illustrating a temperature detection device and a coil according to a modification of the third embodiment.

For example, a fastened portion 53' of a bracket main body 500' illustrated in FIG. 15 protrudes from the heat transfer portion 51 of the bracket main body 500' toward one side in a direction (height direction D3) orthogonal to the direction (D2) in which the extending portion 8A of the coil 8 extends.

The fastened portion 53' is fastened to the coil 8 by the bolt 61 that has a shaft part penetrating through the through hole 530 and the hole of the coil 8, and an unillustrated nut.

Fourth Embodiment

Figure 16A:
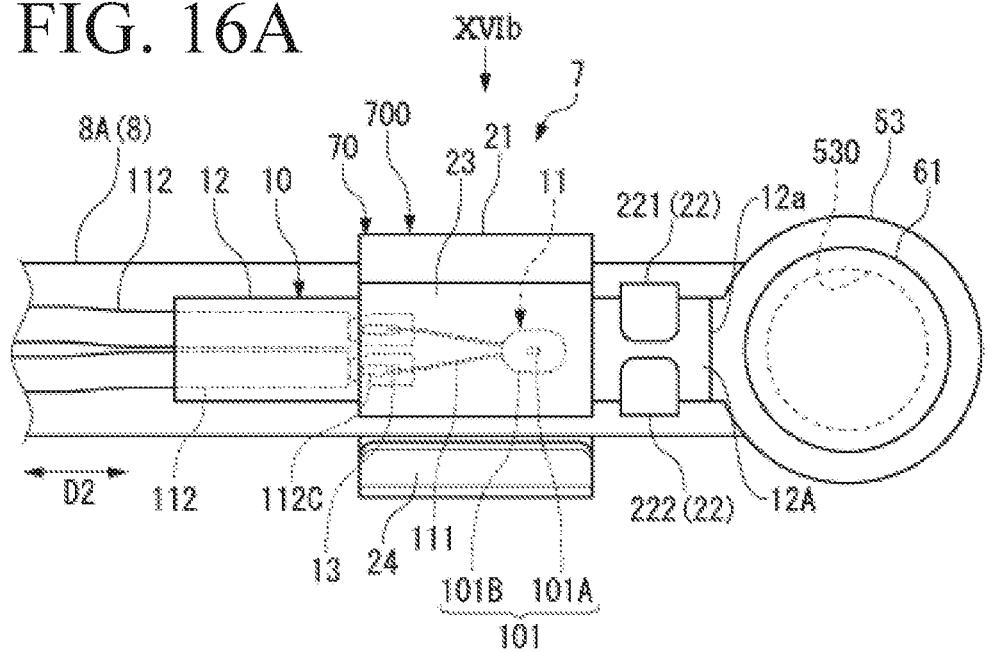
FIG. 16A is a side view illustrating a temperature detection device and a coil according to a fourth embodiment.
Figure 16B:
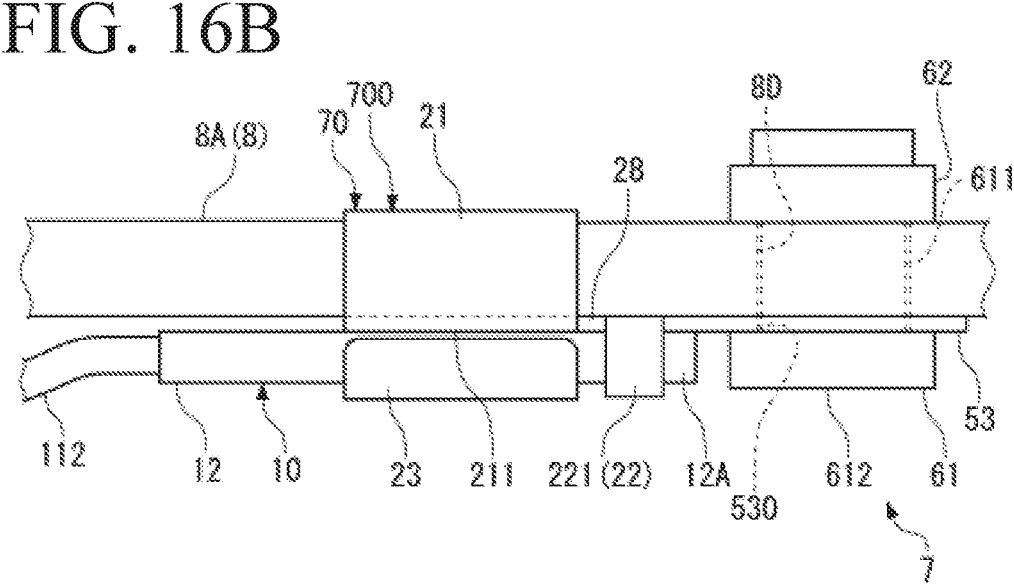
FIG. 16B is a plan view illustrating the temperature detection device and the coil from a direction of an arrow XVIb in FIG. 15.

Next, the fourth embodiment of the present invention is described with reference to FIGS. 16A, 16B.

The temperature detection device 7 according to the fourth embodiment is configured by adding the fastened portion 53 according to the third embodiment (FIGS. 13A, 13B and FIG. 14) to the bracket 20 (FIGS. 2A, 2B) of the temperature detection device 1 according to the first embodiment.

In the following, matters different from the first embodiment are mainly described.

A bracket 70 according to the fourth embodiment includes a bracket main body 700 that clamps the coil 8 by elastic force, the joining portion 22 joined to the temperature sensor 10, and the fastened portion 53 fastened to the coil 8.

The bracket main body 700 includes the clamping portion 21 that internally clamps the coil 8, the heat collection portion 23 that protrudes to outside of the clamping portion 21 and is thermally coupled to the temperature sensor 10, and the stopper 24 that regulates separation of the coil 8 from the clamping portion 21.

The fastened portion 53 is located on the same plane as the first wall 211 (FIG. 16B) of the clamping portion 21.

According to the fourth embodiment, it is possible to more firmly fix the temperature sensor 10 to the coil 8 as compared with the first embodiment by fastening of the fastened portion 53 to the coil 8 in addition to clamping of the coil 8 by the clamping portion 21 of the bracket main body 700.

In the fourth embodiment, the fastened portion 53 can be fastened to the coil 8 by the bolt 61 and the nut 62 while the coil 8 is clamped by the clamping portion 21 of the bracket main body 700. Since the bracket 70 is positioned to the coil 8 by the clamping portion 21, the shaft part 611 of the bolt 61 can be easily inserted into the through hole 530 of the fastened portion 53 and the hole 8D of the coil 8.

Other than the above description, the configurations described in the above-described embodiments can be selected or appropriately modified without departing from the scope of the present invention.

Although not illustrated, the fastened portion 53 according to the third embodiment can be added to the bracket 40 (FIGS. 11A, 11B and FIGS. 12A, 12B) of the temperature detection device 5 according to the second embodiment.

The bracket according to the present invention is not limited to any of the forms described above, and may have an appropriate form.

The temperature sensor 10 is not necessarily provided along the extending portion 8A of the coil 8. The temperature sensor 10 may be inclined to or orthogonal to the extending portion 8A.

The bracket according to the present invention may be configured by assembling a plurality of members as long as the bracket has a simple configuration as a metal member including the bracket main body and the joining portion.

Further, although not illustrated, each of the temperature detection devices according to the first to fourth embodiments may be wrapped with a resin or the like in order to secure insulation property with surroundings. Such a configuration makes it possible to secure the insulation property, to prevent splash of the cooling liquid from directly adhering to the temperature sensor 10, and to improve the heat collection property.

REFERENCE SIGNS LIST 1 to 5 Temperature detection device
8 Coil
8A Extending portion
8B, 8C Surface
8D Hole
10 Temperature sensor
10A One surface
10B Surface
10R Thermosensitive region
11 Thermosensitive element
12 Protective member
12a Front end
12A, 12B, 12C, 12D Joined portion
12E Groove
13 Joint position
20 Bracket
200 Bracket main body
21 Clamping portion
22 Joining portion
23 Heat collection portion
23A Facing portion
24, 24', 25 Stopper
26, 27 Heat collection portion
28 Connection portion
29 Notch
32 Tab (joining portion)
32A Concave part 33 Tab (joining portion)
34 Rivet (joining portion)
35 Engagement protrusion (joining portion)
40 Bracket
42 Joining portion
43 Supporting portion
43A Groove
48 Connection portion
50 Bracket
51 Heat transfer portion
51A Rotation regulation piece
52 Heat collection portion
53, 53' Fastened portion
61 Bolt (fastening member)
62 Nut (fastening member)
70 Bracket
80 Coil element
101 Thermosensitive body
101A Thermosensitive portion
101B Coating glass
110 Electric wire
111 Dumet wire (first electric wire)
112 Lead wire (second electric wire)
112A Core wire
112B Insulating coating
112C Pad
210 Opening
211 First wall
212 Second wall
213 Coupling portion
215 Bent portion
220 Base part
221, 222, 223, 224 Caulking piece (protrusion piece)
231 End edge
241 End part
242 Inclined surface
251 Coil supporting portion
252 Guide portion
411 Wall
421, 422 Caulking piece (protrusion piece)
500, 500' Bracket main body
530 Through hole
611 Shaft part
612 Head part
700 Bracket main body
C1, C2 Clearance
D1 Clamping direction
D2 Front-rear direction
D3 Height direction
S Gap

What is claimed is:

1. A temperature detection device, comprising:
a temperature sensor including a thermosensitive body configured to detect temperature of a coil of a rotary electric machine to be mounted on a vehicle; and
a metal bracket configured to attach the temperature sensor to the coil, wherein:
the bracket includes a bracket main body configured to clamp the coil by elastic force, and a joining portion joined to the temperature sensor,
the bracket main body includes a clamping portion configured to internally clamp the coil, and a heat collection portion that protrudes to outside of the clamping portion and is thermally coupled to the temperature sensor, and
the temperature sensor is disposed between a wall of the clamping portion and a facing portion of the heat collection portion facing the wall.

2. The temperature detection device according to claim 1, wherein the temperature sensor comes into contact with the coil through a part of the clamping portion.

3. The temperature detection device according to claim 1, wherein the wall and the facing portion extend over a thermosensitive region that includes at least the thermosensitive body of the temperature sensor.

4. The temperature detection device according to claim 1, wherein the bracket main body includes a fastened portion fastened to the coil.

5. An assembly, comprising:
the temperature detection device according to claim 4; and
a coil element configuring a part of the coil.

6. The temperature detection device according to claim 1, wherein the joining portion is joined to a joined portion of the temperature sensor that is located at a position different from the thermosensitive body.

7. The temperature detection device according to claim 6, wherein the joined portion is located at a position of the temperature sensor different from both of the thermosensitive body and an electric wire provided on the thermosensitive body.

8. The temperature detection device according to claim 7, wherein
the temperature sensor includes a thermosensitive element that includes the thermosensitive body and an electric wire provided on the thermosensitive body, and an insulating protective member provided at least on the thermosensitive body and a part of the electric wire of the thermosensitive element, and
the joined portion is located on the protective member.

9. The temperature detection device according to claim 1, wherein a thermosensitive region including at least the thermosensitive body of the temperature sensor further includes a part of an electric wire provided on the thermosensitive body.

10. The temperature detection device according to claim 1, wherein the temperature sensor extends in a longitudinal direction in which an electric wire provided on the thermosensitive body extends, and is surrounded around an axis line set along the longitudinal direction by the bracket main body.

11. The temperature detection device according to claim 1, wherein the bracket is a single member integrally made of a metal plate.

12. The temperature detection device according to claim 1, wherein the joining portion includes paired protrusion pieces caulked to the temperature sensor.

13. The temperature detection device according to claim 1, wherein the bracket main body is provided with a stopper that prevents separation of the coil.

14. An assembly, comprising:
the temperature detection device according to claim 1, assembled to the coil of the rotary electric machine; and
a coil element configuring a part of the coil, wherein
the metal bracket attaches the temperature sensor to the coil element, and portion joined to the temperature sensor, and
the clamping portion internally clamps the coil by elastic force.

15. A metal bracket for attaching a temperature sensor to a coil of a rotary electric machine to be mounted on a vehicle, the temperature sensor including a thermosensitive body configured to detect temperature of the coil, the metal bracket comprising:
- a bracket main body including a clamping portion configured to internally clamp the coil, and a heat collection portion that protrudes to outside of the clamping portion and is thermally couplable to the temperature sensor, and
- a joining portion joined to the temperature sensor,
- wherein the clamping portion is a U-shaped body that opens in a direction toward the heat collection portion, and
- wherein the joining portion is joined to a joined portion of the temperature sensor that is located at a position different from the thermosensitive body.

16. An assembly comprising the metal bracket according to claim 15, the coil, and the temperature sensor, wherein the metal bracket attaches the temperature sensor to the coil.

17. A temperature detection device, comprising:
- a temperature sensor including a thermosensitive body configured to detect temperature of a coil of a rotary electric machine to be mounted on a vehicle; and
- a metal bracket configured for attaching the temperature sensor to the coil, wherein
- the bracket includes a bracket main body clamping the temperature sensor by elastic force, and a joining portion joined to the temperature sensor, wherein the bracket main body is configured to clamp the coil by elastic force,
- wherein the joining portion is joined to a joined portion of the temperature sensor that is located at a position different from the thermosensitive body.

18. The temperature detection device according to claim 17, wherein the bracket main body is provided with a supporting portion supporting the temperature sensor.

19. An assembly, comprising:
- the temperature detection device according to claim 17; and
- a coil element configuring a part of the coil.

20. The temperature detection device according to claim 17, wherein the bracket main body includes a fastened portion fastened to the coil.

* * * * *